(12) United States Patent
Billi-Duran et al.

(10) Patent No.: US 10,319,128 B2
(45) Date of Patent: Jun. 11, 2019

(54) AUGMENTED REALITY PRESENTATION OF AN INDUSTRIAL ENVIRONMENT

(71) Applicant: Rockwell Automation Technologies, Inc., Mayfield Heights, OH (US)

(72) Inventors: Sharon M. Billi-Duran, Euclid, OH (US); Christopher W. Como, Chagrin Falls, OH (US); Edward A. Gray, Olmsted Township, OH (US); Kyle K. Reissner, Hudson, OH (US); Jonathan D. Walter, Broadview Heights, OH (US); Mohit Singhai, Lyndhurst, OH (US); Douglas J. Reichard, Fairview Park, OH (US); Scott N. Sandler, Chagrin Falls, OH (US); Ronald E. Bliss, Twinsburg, OH (US); Michael J. Pantaleano, Willoughby, OH (US); Ryan Cahalane, Chagrin Falls, OH (US); Jessica L. Korpela, Milwaukee, WI (US); Bruce T. McCleave, Jr., Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 17 days.

(21) Appl. No.: 15/391,213

(22) Filed: Dec. 27, 2016

(65) Prior Publication Data

US 2018/0089870 A1 Mar. 29, 2018

Related U.S. Application Data

(60) Provisional application No. 62/399,983, filed on Sep. 26, 2016.

(51) Int. Cl.
*G06F 3/01* (2006.01)
*G09B 5/02* (2006.01)
(Continued)

(52) U.S. Cl.
CPC .......... *G06T 11/60* (2013.01); *G05B 23/0205* (2013.01); *G06F 3/011* (2013.01);
(Continued)

(58) Field of Classification Search
None
See application file for complete search history.

(56) References Cited

U.S. PATENT DOCUMENTS

| 5,168,441 A | 12/1992 | Onarheim et al. |
| 5,777,874 A | 7/1998 | Flood et al. |

(Continued)

FOREIGN PATENT DOCUMENTS

| CN | 103543700 B | 8/2016 |
| EP | 1 814 045 A2 | 8/2007 |

(Continued)

OTHER PUBLICATIONS

Extended European Search Report for EP Patent Application Serial No. 17150085.3-1802 dated May 10, 2017, 8 pages.
(Continued)

*Primary Examiner* — Frank S Chen
(74) *Attorney, Agent, or Firm* — Amin, Turocy & Watson, LLP

(57) ABSTRACT

A industrial visualization system generates augmented reality presentations for rendering on a user's wearable computer as the user traverses an industrial facility. The system can leverage data indexed in a federated data model that unifies plant-wide data from multiple diverse sources under a common namespace. By leveraging the unified plant data and interacting with a wearable computer worn by a user, the augmented reality presentation system provides automation system data, notifications, and proactive guidance to a user via modification of the user's view of his or her immediate surroundings. Such modifications can include superimpos- (Continued)

ing data values or indicators on the user's view of a machine or automation system through the user's wearable computer. The system can customize presentation of this information based on the user's role, location, line of sight, type of wearable device, and/or other contextual information.

20 Claims, 21 Drawing Sheets

(51) Int. Cl.
  *G05B 23/02* (2006.01)
  *G06Q 10/00* (2012.01)
  *G06T 11/60* (2006.01)

(52) U.S. Cl.
  CPC .............. *G06Q 10/20* (2013.01); *G09B 5/02* (2013.01); *G05B 2219/32014* (2013.01)

(56) References Cited

U.S. PATENT DOCUMENTS

| | | | |
|---|---|---|---|
| 6,002,406 A | 12/1999 | Zhao | |
| 6,334,124 B1 | 12/2001 | Bouchard et al. | |
| 6,583,794 B1 | 6/2003 | Wattenberg | |
| 6,788,315 B1 | 9/2004 | Kekic et al. | |
| 7,612,661 B1 | 11/2009 | Johnson et al. | |
| 8,285,744 B2 | 10/2012 | Dorgelo et al. | |
| 8,453,091 B1 | 5/2013 | Rao et al. | |
| 8,489,641 B1 | 7/2013 | Seefeld et al. | |
| 8,819,149 B2 | 8/2014 | Amidon et al. | |
| 8,886,153 B2 | 11/2014 | Velusamy | |
| 9,069,382 B1 | 6/2015 | Starner et al. | |
| 9,213,714 B1 | 12/2015 | Ording | |
| 9,237,141 B2 | 1/2016 | Logue et al. | |
| 9,438,648 B2 | 9/2016 | Asenjo et al. | |
| 9,709,978 B2 | 7/2017 | Asenjo et al. | |
| 9,937,577 B2 | 4/2018 | Daniel et al. | |
| 9,952,882 B2 | 4/2018 | Kuscher et al. | |
| 2002/0049775 A1 | 4/2002 | Friedrich et al. | |
| 2002/0158873 A1 | 10/2002 | Williamson | |
| 2004/0181549 A1 | 9/2004 | Pate | |
| 2005/0010307 A1 | 1/2005 | Dove et al. | |
| 2005/0023347 A1 | 2/2005 | Wetzel et al. | |
| 2005/0188376 A1 | 8/2005 | Matsumoto et al. | |
| 2005/0204315 A1 | 9/2005 | Knol et al. | |
| 2006/0161544 A1 | 7/2006 | Lee et al. | |
| 2006/0241792 A1* | 10/2006 | Pretlove | G06F 3/011 700/83 |
| 2006/0271884 A1 | 11/2006 | Hurst | |
| 2007/0078824 A1 | 4/2007 | Dorgelo et al. | |
| 2008/0072180 A1 | 3/2008 | Chevalier et al. | |
| 2009/0077055 A1 | 3/2009 | Dillon et al. | |
| 2009/0085934 A1 | 4/2009 | Baier et al. | |
| 2009/0086021 A1 | 4/2009 | Baier et al. | |
| 2009/0088875 A1 | 4/2009 | Baier et al. | |
| 2009/0089225 A1 | 4/2009 | Baier et al. | |
| 2009/0112816 A1 | 4/2009 | Marlow | |
| 2009/0125796 A1 | 5/2009 | Day et al. | |
| 2009/0216341 A1 | 8/2009 | Enkerud et al. | |
| 2009/0307162 A1 | 12/2009 | Bui et al. | |
| 2009/0307255 A1 | 12/2009 | Park | |
| 2010/0016995 A1 | 1/2010 | Barat | |
| 2010/0082661 A1 | 4/2010 | Beaudreau | |
| 2011/0022198 A1 | 1/2011 | Plache et al. | |
| 2011/0119227 A1 | 3/2011 | Wang et al. | |
| 2011/0093188 A1 | 4/2011 | Barkai et al. | |
| 2011/0115816 A1* | 5/2011 | Brackney | G06Q 10/06 345/629 |
| 2011/0298579 A1 | 12/2011 | Hardegger et al. | |
| 2011/0316884 A1 | 12/2011 | Giambalvo et al. | |
| 2012/0120070 A1 | 5/2012 | Baillot | |
| 2012/0233573 A1 | 9/2012 | Sullivan et al. | |
| 2012/0242648 A1 | 9/2012 | Baier et al. | |
| 2012/0249588 A1* | 10/2012 | Tison | G06F 1/1696 345/633 |
| 2012/0249741 A1 | 10/2012 | Maciocci et al. | |
| 2012/0254792 A1 | 10/2012 | Husoy et al. | |
| 2012/0259436 A1 | 10/2012 | Resurreccion et al. | |
| 2012/0314571 A1* | 12/2012 | Forssell | H04W 12/08 370/230 |
| 2013/0006395 A1 | 1/2013 | Plache et al. | |
| 2013/0031508 A1 | 1/2013 | Kodosky et al. | |
| 2013/0054573 A1 | 2/2013 | Snellman et al. | |
| 2013/0073400 A1 | 3/2013 | Heath | |
| 2013/0110978 A1 | 5/2013 | Gordon et al. | |
| 2013/0120449 A1 | 5/2013 | Ihara et al. | |
| 2013/0124253 A1 | 5/2013 | Cooper et al. | |
| 2013/0124465 A1 | 5/2013 | Pingel et al. | |
| 2013/0124613 A1 | 5/2013 | Plache et al. | |
| 2013/0125233 A1 | 5/2013 | Bush et al. | |
| 2013/0169681 A1 | 7/2013 | Rasane et al. | |
| 2013/0211546 A1 | 8/2013 | Lawson et al. | |
| 2013/0211559 A1 | 8/2013 | Lawson et al. | |
| 2013/0222373 A1 | 8/2013 | Weinstein et al. | |
| 2013/0246539 A1 | 9/2013 | Davis | |
| 2013/0083012 A1 | 10/2013 | Han et al. | |
| 2013/0257863 A1 | 10/2013 | Mikkelsen | |
| 2013/0275908 A1 | 10/2013 | Reichard | |
| 2013/0290899 A1 | 10/2013 | Amran | |
| 2014/0032849 A1 | 1/2014 | De Vleeschauwer et al. | |
| 2014/0047064 A1 | 2/2014 | Maturana et al. | |
| 2014/0047106 A1 | 2/2014 | Leung et al. | |
| 2014/0047107 A1 | 2/2014 | Maturana et al. | |
| 2014/0143395 A1 | 5/2014 | Geltner et al. | |
| 2014/0207870 A1 | 7/2014 | Vaya | |
| 2014/0240356 A1 | 8/2014 | Cupitt et al. | |
| 2014/0250377 A1 | 9/2014 | Bisca et al. | |
| 2014/0253588 A1* | 9/2014 | Mandala | G02B 27/01 345/633 |
| 2014/0258940 A1 | 9/2014 | Han et al. | |
| 2014/0282215 A1 | 9/2014 | Grubbs et al. | |
| 2014/0316540 A1 | 10/2014 | Loncar et al. | |
| 2014/0335480 A1 | 11/2014 | Asenjo et al. | |
| 2014/0336785 A1 | 11/2014 | Asenjo et al. | |
| 2014/0358256 A1 | 12/2014 | Billi et al. | |
| 2015/0077555 A1 | 3/2015 | Scalisi | |
| 2015/0146007 A1 | 5/2015 | Dusik et al. | |
| 2015/0213465 A1 | 7/2015 | Noyes et al. | |
| 2015/0281329 A1 | 10/2015 | Dimov | |
| 2015/0371455 A1 | 12/2015 | Abdel-Rahman et al. | |
| 2016/0103750 A1 | 4/2016 | Cooper et al. | |
| 2016/0127690 A1 | 5/2016 | Kaehler et al. | |
| 2016/0132538 A1 | 5/2016 | Bliss et al. | |
| 2016/0132595 A1 | 5/2016 | Bliss et al. | |
| 2016/0176724 A1 | 6/2016 | Ji et al. | |
| 2016/0217381 A1 | 7/2016 | Bloomquist et al. | |
| 2016/0226731 A1 | 8/2016 | Maroulis | |
| 2016/0267759 A1 | 9/2016 | Kerzner | |
| 2016/0274553 A1 | 9/2016 | Strohmenger et al. | |
| 2016/0292895 A1 | 10/2016 | Billi et al. | |
| 2016/0337289 A1 | 11/2016 | Duca et al. | |
| 2016/0337441 A1 | 11/2016 | Bloomquist et al. | |
| 2016/0343163 A1* | 11/2016 | Venkatesha | G06T 19/006 |
| 2017/0053445 A1 | 2/2017 | Chen et al. | |
| 2017/0060379 A1 | 3/2017 | Capozella et al. | |
| 2017/0091607 A1 | 3/2017 | Emeis et al. | |
| 2017/0108838 A1 | 4/2017 | Todeschini et al. | |
| 2017/0116259 A1 | 4/2017 | Elliot et al. | |
| 2017/0195265 A1 | 7/2017 | Billi et al. | |
| 2017/0270362 A1 | 9/2017 | Barnehama et al. | |
| 2017/0300753 A1 | 10/2017 | Billi et al. | |
| 2017/0337352 A1* | 11/2017 | Williams | G06F 21/10 |
| 2018/0054432 A1* | 2/2018 | Bailey | G06F 3/0622 |

FOREIGN PATENT DOCUMENTS

| | | |
|---|---|---|
| EP | 1906289 | 4/2008 |
| EP | 2077473 | 7/2009 |
| EP | 2592812 | 5/2013 |
| EP | 2801935 | 11/2014 |
| EP | 2 927 854 A1 | 10/2015 |
| EP | 2 942 717 A1 | 11/2015 |
| EP | 2940544 | 11/2015 |
| EP | 3 018 597 A1 | 5/2016 |

(56) References Cited

FOREIGN PATENT DOCUMENTS

| EP | 3 032 480 A1 | 6/2016 |
|---|---|---|
| EP | 3 037 901 A2 | 6/2016 |
| JP | 2008-201101 A | 9/2008 |
| JP | 2016-101045 A | 1/2016 |
| WO | 2016/057386 A1 | 4/2016 |

OTHER PUBLICATIONS

Non-Final Office Action for U.S. Appl. No. 14/675,129, dated May 4, 2017, 58 pages.
European Office Action for European Patent Application Serial No. 16196582.7-1871 dated Jan. 31, 2017, 9 pages.
Office Action for U.S. Appl. No. 15/241,354 dated Jan. 24, 2018, 95 pages.
Microsoft HoloLens demo onstage at BUILD 201, https://www.youtube.com/watch?v=3AADEqLIALk, 2 pages.
European Office Action for EP Patent Application Serial No. 16196582.7, dated Feb. 14, 2018, 7 pages.
European Office Action for EP Patent Application Serial No. 17150085.3, dated Dec. 19, 2017, 5 pages.
Extended European Search Report for EP Patent Application Serial No. 17178555.3 dated Jan. 8, 2018, 73 pages.
Communication Pursuant to Article 94(3) EPC Received for EP Patent Application No. 16161305.4 dated Sep. 8, 2017, 7 pages.
Extended European Search Report for EP Patent Application Serial No. 17178556.1-1871 dated Aug. 23, 2017, 10 pages.
Extended European Search Report for EP Patent Application Serial No. 17186540.5-1958 dated Sep. 28, 2017, 8 pages.
European Office Action for EP Patent Application Serial No. 16196582.7, dated May 9, 2017, 2 pages.
Final Office Action for U.S. Appl. No. 14/675,129, dated Dec. 1, 2017, 63 pages.
Office Action for U.S. Appl. No. 14/928,305, dated Dec. 22, 2017, 24 pages.
Rockwell Automation. The Power of Collaboration Working for you: PartnerNetwork Solutions from Rockwell Automation; Win-911 Software; Publication ENCOMP-BR007B-EN-P—Dec. 2013.
Extended European Search Report for EP Patent Application Serial No. 16161305.4, dated Sep. 5, 2016, 10 pages.
European Office Action for EP Patent Application Serial No. 16161305.4, dated Oct. 10, 2016, 2 pages.
Non-Final Office Action received for U.S. Appl. No. 15/170,676, dated May 24, 2018, 163 pages.
Communication pursuant to Rule 69 EPC for EP Patent Application Serial No. 17200575.3 dated May 22, 2018, 2 pages.
Communication pursuant to Rule 69 EPC for EP Patent Application Serial No. 17200580.3 dated May 22, 2018, 2 pages.
Non-Final Office Action received for U.S. Appl. No. 14/987,399 dated Jun. 1, 2018, 83 pages.
Final Office Action received for U.S. Appl. No. 14/928,305 dated Jun. 5, 2018, 16 pages.
Final Office Action received for U.S. Appl. No. 15/241,354, dated Jul. 11, 2018, 80 pages.
Non-Final Office Action received for U.S. Appl. No. 15/240,161, dated Jul. 27, 2018, 54 pages.
Extended European Search Report for European Application Serial No. 17200391.5 dated Jan. 18, 2018, 7 pages.
Communication pursuant to Rule 69 EPC for EP Patent Application Serial No. 17186540.5 dated Apr. 4, 2018, 2 pages.
Communication pursuant to Rule 69 EPC for EP Patent Application Serial No. 17178556.1 dated Feb. 26, 2018, 2 pages.
Communication pursuant to Rule 69 EPC for EP Patent Application Serial No. 17178555.3 dated Feb. 26, 2018, 2 pages.
Extended European Search Report for European Application Serial No. 17200575.3 dated Apr. 17, 2018, 8 pages.
Extended European Search Report for European Application Serial No. 17200580.3 dated Apr. 17, 2018, 8 pages.
Chinese Office Action for Chinese Application Serial No. 201610187424.2 dated Mar. 9, 2018, 6 pages.
Non-Final Office Action for U.S. Appl. No. 14/928,305, dated Dec. 31, 2018, 19 pages.
Non-Final Office Action for U.S. Appl. No. 15/391,260, dated Nov. 30, 2018, 78 pages.
Final Office Action received for U.S. Appl. No. 15/170,676, dated Dec. 26, 2018, 46 pages.
Non-Final Office Action for U.S. Appl. No. 15/718,907, dated Dec. 14, 2018, 75 pages.
Chinese Second Office Action for Chinese Application Serial No. 201610187424.2 dated Sep. 4, 2018, 11 pages (including English Translation).
Non-Final Office Action for U.S. Appl. No. 15/465,246 dated Jan. 24, 2019, 411 pages.
Communication pursuant to Rule 94(3) EPC for EP Patent Application Serial No. 17186540.5 dated Feb. 21, 2019, 5 pages.
Non-Final Office Action for U.S. Appl. No. 15/718,856 dated Mar. 5, 2019, 68 pages.

* cited by examiner

US 10,319,128 B2

AUGMENTED REALITY PRESENTATION OF AN INDUSTRIAL ENVIRONMENT

CROSS-REFERENCE TO RELATED APPLICATIONS

This application claims priority to U.S. Provisional Application Ser. No. 62/399,983, filed on Sep. 26, 2016, and entitled "AUGMENTED REALITY PRESENTATION OF AN INDUSTRIAL ENVIRONMENT," the entirety of which is incorporated herein by reference.

BACKGROUND

The subject matter disclosed herein relates generally to industrial automation systems, and, more particularly, to visualization of industrial data.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for generation and delivery of augmented reality presentations is provided, comprising a device interface component configured to receive contextual data from a client device, the contextual data comprising at least location data identifying a location within an industrial environment and orientation data identifying an orientation of the client device; a search component configured to, in response to a determination that the contextual data indicates that an industrial automation system is within a field of view of the client device, identify a subset of data items maintained in a federated data model that are relevant to the industrial automation system; and a visualization component configured to generate an augmented reality presentation that renders the subset of the data items on the client device as respective overlays on the field of view, wherein the device interface component is further configured to send the augmented reality presentation to the client device.

Also, one or more embodiments provide a method for generating augmented reality presentations for rendering of industrial data, where the method comprises receiving, by a system comprising at least one processor, contextual data from a client device, wherein the contextual data comprises at least location data identifying a location of the client device within an industrial environment and orientation data identifying an orientation of the client device; in response to determining that the contextual data signifies that an automation system is within a field of view of the client device, searching, by the system, a federated data model for a set of data items that are relevant to the automation system; generating, by the system, an augmented reality presentation that renders the set of data items on the client device as respective overlays on the field of view; and sending, by the system, the augmented reality presentation to the client device.

Also, according to one or more embodiments, a non-transitory computer-readable medium is provided having stored thereon instructions that, in response to execution, cause a system to perform operations, the operations comprising receiving contextual data from a client device, the contextual data comprising at least location data that identifies a location of the client device within an industrial environment and orientation data identifying an orientation of the client device; in response to determining that the contextual data indicates that an automation system is within a field of view of the client device, retrieving a subset of data items indexed in a federated data model that are determined to be relevant to the automation system; generating an augmented reality presentation that renders the subset of data items on the client device as respective overlays on the field of view; and sending the augmented reality presentation to the client device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
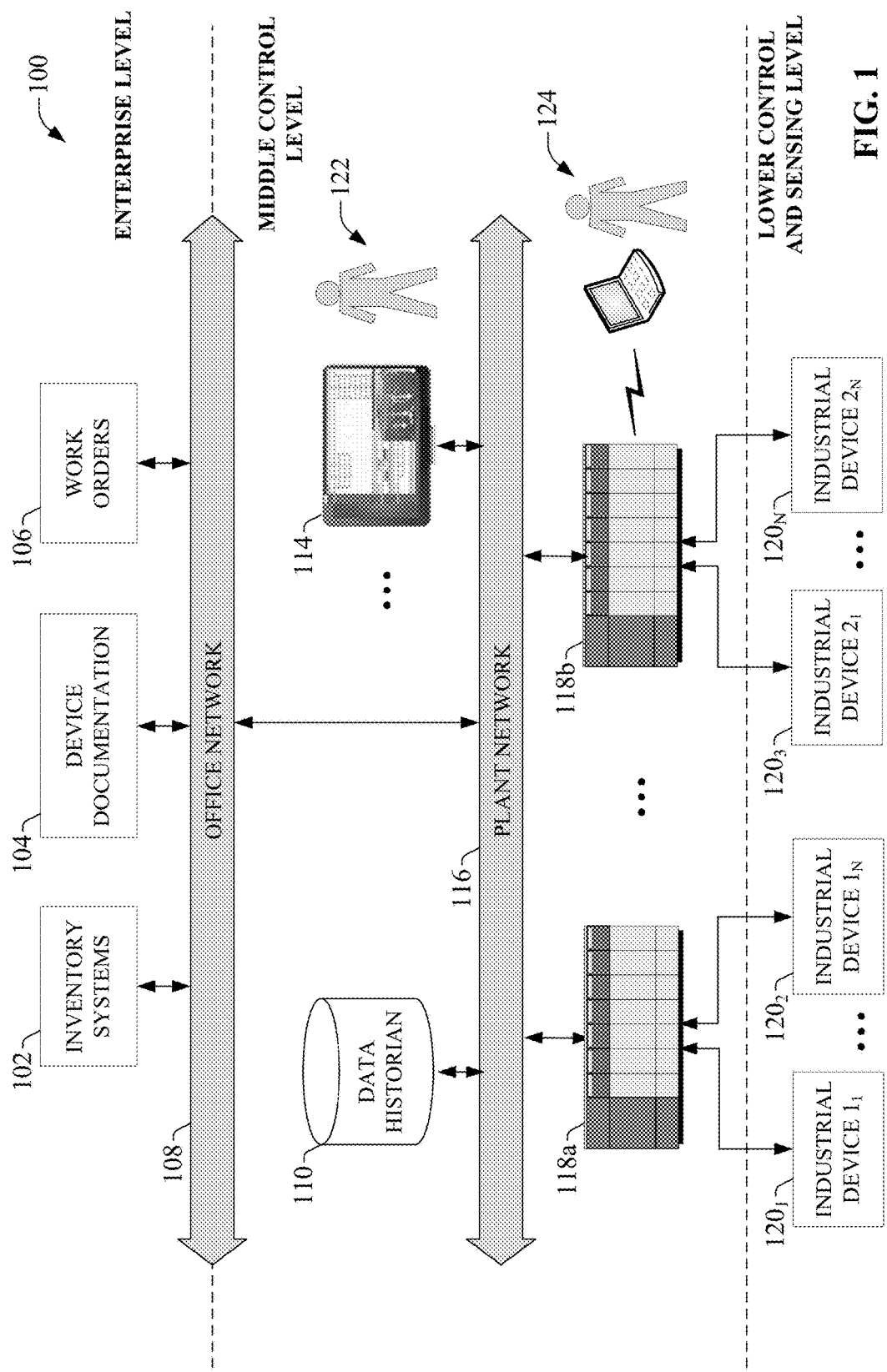
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or a hybrid device that combines controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc.

HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Typically, in order to view information relating to the industrial processes carried out by the machines and devices that make up industrial control environment 100, users must either rely on the pre-developed interface display screens executing on HMIs 114 (see user 122), or directly connect to the devices using a portable computer in order to view control programming and device configurations (see user 124). While these techniques allow a user to view relevant data values and alarms associated with the various machines and devices, HMI displays and controller programming tools provide little in the way of troubleshooting guidance or analysis in the event of a machine fault or other performance issue. Moreover, the manner of presenting machine and device data via HMI screens or controller programming tools requires the user to visually correlate the data presented on the screens with the user's own view of the relevant machines or devices.

Some industrial environments may also include other sources of potentially relevant information relating to specific aspects of the controlled industrial systems. These may include, for example, a data historian 110 that aggregates and stores production information collected from the industrial controllers 118 or other data sources, or a device documentation store 104 containing electronic documentation for the various industrial devices making up the controlled industrial systems. Other information sources may include an inventory tracking system 102, a work order management system 106, repositories for machine or process drawings and documentation, vendor product documentation storage, vendor knowledgebases, internal knowledgebases, or other such systems, some or all of which may reside on an office network 108 of the industrial environment. These diverse information sources are spread across many locations and systems both within the plant environment and externally (e.g., on the Internet). When diagnosing problems, maintenance personnel are often required to search several of these sources of information individually, using several different software packages specific to the respective data sources being searched. Moreover, searching for information pertaining to a particular device or machine often requires an extensive knowledge of the overall industrial system in order to locate the data source (e.g., industrial controllers, HMIs, etc.), to be searched, as well as to identify the relevant operator screens and control program routines. Individually searching each of these data sources in connection with solving a system downtime issue or other problem can delay correction of maintenance issues, resulting in lost revenue and scheduling problems. Also, if an operator or maintenance personnel is not near an information source—such as an HMI terminal—at the time an operational or maintenance issue occurs, the user may not be made aware of the issue in a timely fashion.

To address these and other issues, one or more embodiments of the present disclosure provide a system that generates and delivers augmented reality presentations to a user via a wearable computer or other client device. The augmented reality presentation system is built on a data indexing platform that unifies plant-wide data from multiple diverse sources under a common namespace, or federated data model. By leveraging the unified plant data in this model and interacting with a wearable computer associated with a user, the augmented reality presentation system can provide automation system data, notifications, and proactive guidance to a user via modification of the user's view of his or her immediate surroundings. Such modifications can include, for example, superimposing data values or indicators on a user's view of a machine or automation system through the user's wearable computer (or other client device capable of rendering a substantially real-time view of the machine or system). The system can customize presentation of this information based on the user's role, location, line of sight, type of wearable device, and/or other contextual information.

Figure 2:
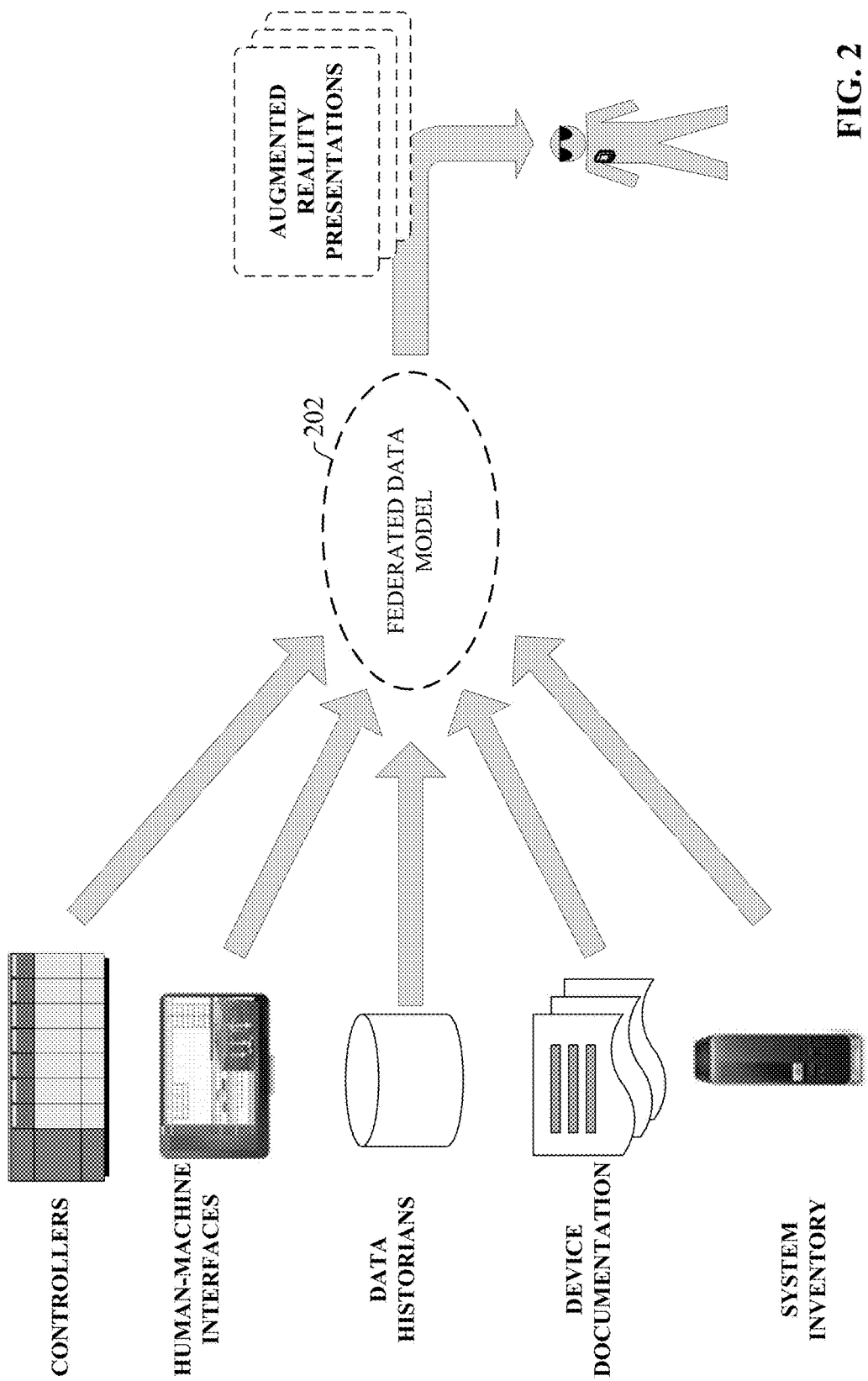
FIG. 2 is a conceptual diagram illustrating federation of industrial data by an indexing system.

FIG. 2 is a conceptual diagram illustrating federation of industrial data for use by the augmented reality presentation system described herein. In one or more embodiments, the system data from multiple sources both across the industrial facility and external to the facility, including but not limited to industrial controllers, HMIs, data historians, device and system documentation repositories (e.g., drawings, manuals, knowledgebase articles, etc.), system inventory management systems, and/or other such platforms. The search system indexes and correlates this multi-platform data to yield a federated data model 202 that can be accessed and searched by the augmented reality presentation system based on a user's current context, line of sight, type of client device being used by the user (e.g., wearable computer, handheld device, etc.), and/or other relevant information, such that customized augmented reality presentations can be generated based on relevant subsets of data in the model 202.

In an example scenario, as a user is viewing an automation system, machine, or industrial device through a wearable computer (or as a substantially real-time video image rendered on the user's client device), the augmented reality presentation system can monitor the wearable computer to determine the user's location relative to the automation system, the user's current line of sight or field of view, and/or other contextual information indicative of the user's relationship to the automation system. Based on the determined identity of the automation system currently being viewed by the user, the augmented reality presentation system can search the federated data model 202 to determine current status information for devices and/or machines that make up the automation system, or for a process being carried out by the automation system. The augmented reality presentation system can then generate augmented reality presentations and deliver these presentations to the user's wearable client device; e.g., as graphical or text-based indicators overlaid on the user's field of view, such that each indicator is positioned near the machine or device to which the indicator pertains. For example, if the user's current view encompasses a motor-driven conveyor and a motor drive that controls the motor, the presentation system may superimpose a current operating status of the motor drive (e.g., a current speed, a fault condition, an operating mode, etc.) near the image of the motor drive as perceived by the user. If the user is currently viewing a die-cast furnace, the presentation system may superimpose a current furnace temperature near the view of the furnace. In both of these examples, the substantially real-time information presented to the user is located and obtained based on indexed data recorded in the federated data model. In yet another example, a monitoring component of the augmented reality presentation system can identify a maintenance issue based on analysis of substantially real-time system collected for the automation system and indexed in the data model 202. In response to detecting such a maintenance issue, the presentation system can deliver a notification to a wearable computer or other client device associated with a suitable plant technician. To assist the selected user in locating the source of the detected problem, the augmented reality presentation system can superimpose graphics on the user's view of his or her environment that guide the user to the source of the issue. These graphics can include, for example, arrows or other indicators that guide the user to the affected machine or device, as well as indicators that direct the user's focus of attention to specific areas or components of an automation system, machine, or industrial device requiring attention.

Figure 3:
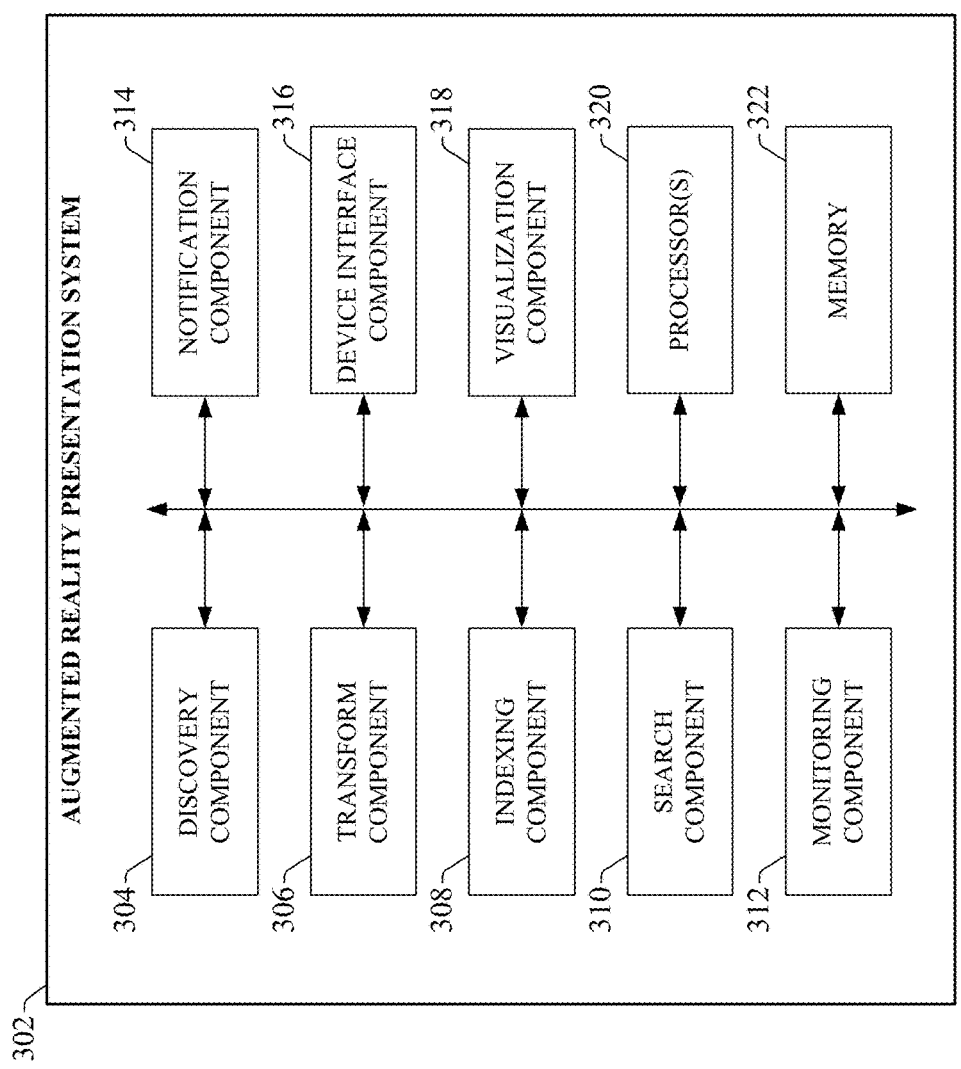
FIG. 3 is a block diagram of an example augmented reality presentation system.

FIG. 3 is a block diagram of an example augmented reality presentation system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Augmented reality presentation system 302 can include a discovery component 304, a transform component 306, an indexing component 308, a search component 310, a monitoring component 312, a notification component 314, a device interface component 316, a visualization component 318, one or more processors 320, and memory 322. In various embodiments, one or more of the discovery component 304, transform component 306, indexing component 308, search component 310, monitoring component 312, notification component 314, device interface component 316, visualization component 318, the one or more processors 320, and memory 322 can be electrically and/or communicatively coupled to one another to perform one or more of the functions of the augmented reality presentation system 302. In some embodiments, components 304, 306, 308, 310, 312, 314, 316, and 318 can comprise software instructions stored on memory 322 and executed by processor(s) 320. Augmented reality presentation system 302 may also interact with other hardware and/or software components not depicted in FIG. 3. For example, processor(s) 320 may interact with one or more external user interface devices, such as a keyboard, a mouse, a display monitor, a touchscreen, or other such interface devices.

Discovery component 304 can be configured to gather information from one or more industrial automation devices and other data sources both internal and external to an industrial environment. Information gathered by the discovery component 304 can include, but is not limited to, industrial device identification and configuration data, device programming, historical data, networking information, device documentation, product inventory information, audio and/or visual information submitted by one or more client devices, troubleshooting information from device vendors' technical support web pages, etc. The discovery component 304 can also be configured to discover interdependencies between the data items.

Transform component 306 can be configured to transform and tag the data discovered by or submitted to the discovery component 304 prior to indexing. This can include, for example, transforming heterogeneous data items discovered on different types of data platforms to a homogeneous format for indexing under a common namespace, tagging the discovered data with relevant contextual information— e.g., a plant, production area, machine, or device on which the data was discovered; geo-tag information; a relationship or interdependency between a given data item and another data item; a data platform corresponding to the data item (e.g., industrial control program, HMI application, knowledgebase article, device documentation, etc.)—or other data modifications.

Indexing component 308 can be configured to generate a federated data model (e.g., federated data model 202) defining locations and sources of data items throughout the industrial system, as well as relationships between the data items, based on the discovered and transformed data. The resulting federated data model is capable of identifying and reporting sources of specific data items or tags, as well as relevant contextual data relating to a specified data item. Using this information, the augmented reality presentation system 302 can identify and retrieve substantially real-time automation system information determined to be relevant to a user given the user's present context and current system statuses, and deliver this information to the user's wearable computer or other client device.

Search component 310 can be configured to submit search queries to the federated data model and retrieve search results identifying locations of relevant data items throughout the industrial system. In one or more embodiments, the search component 310 can generate these search queries dynamically for a given user based on the user's current location relative to an automation system or industrial device, the direction of the user's current line of sight, the user's role, or other such user-specific information.

Monitoring component 312 can be configured to monitor the indexed data items for defined trigger conditions, and to submit automated queries to the federated data model in response to detection of a trigger condition. The defined trigger conditions can correspond to conditions indicative of a performance or operational issue relating to the industrial system (e.g., a downtime condition, an abnormal condition, a current or predicted non-optimal operation condition, etc.). Notification component 314 can be configured to send notifications to one or more selected recipients in response to detection of a trigger condition by monitoring component 312. The notification can include additional information about the performance issue corresponding to the trigger condition, where the additional information is retrieved from the federated data model based on the automated search query submitted by the monitoring component 312 in response to the trigger. The notification component 314 can work in conjunction with the visualization component 318 such that, in addition to providing the notification, the system augments the user's view of his or her environment via a wearable computer to guide the user to the source of the issue, as well as to provide guided recommendations or workflows for addressing the issue.

Device interface component 316 can be configured to exchange information between the augmented reality presentation system 302 and a wearable computer or other client device having authorization to access the system. For example, the device interface component 316 can receive contextual information about a particular user based on a monitoring of the user's wearable computer or other client device, as well as deliver search results, notifications, and augmented reality presentations to the wearable computer.

Visualization component 318 can be configured to generate augmented reality presentations for delivery to a user's wearable computer or other client device. Such augmented reality presentations can include graphical overlays that are superimposed over a user's field of view of his or her surroundings via a wearable computer. These graphical overlays can include, but are not limited to, operational or status data indicators (both alphanumerical and icon-based indicators) for an industrial system or device within the user's field of view, indicators that direct a user to a location of an industrial system or device within a plant environment for which a maintenance issue has been detected, guidance indicators for assisting a user in diagnosing and addressing an identified problem with an industrial system or device, or other such overlays.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Figure 4:
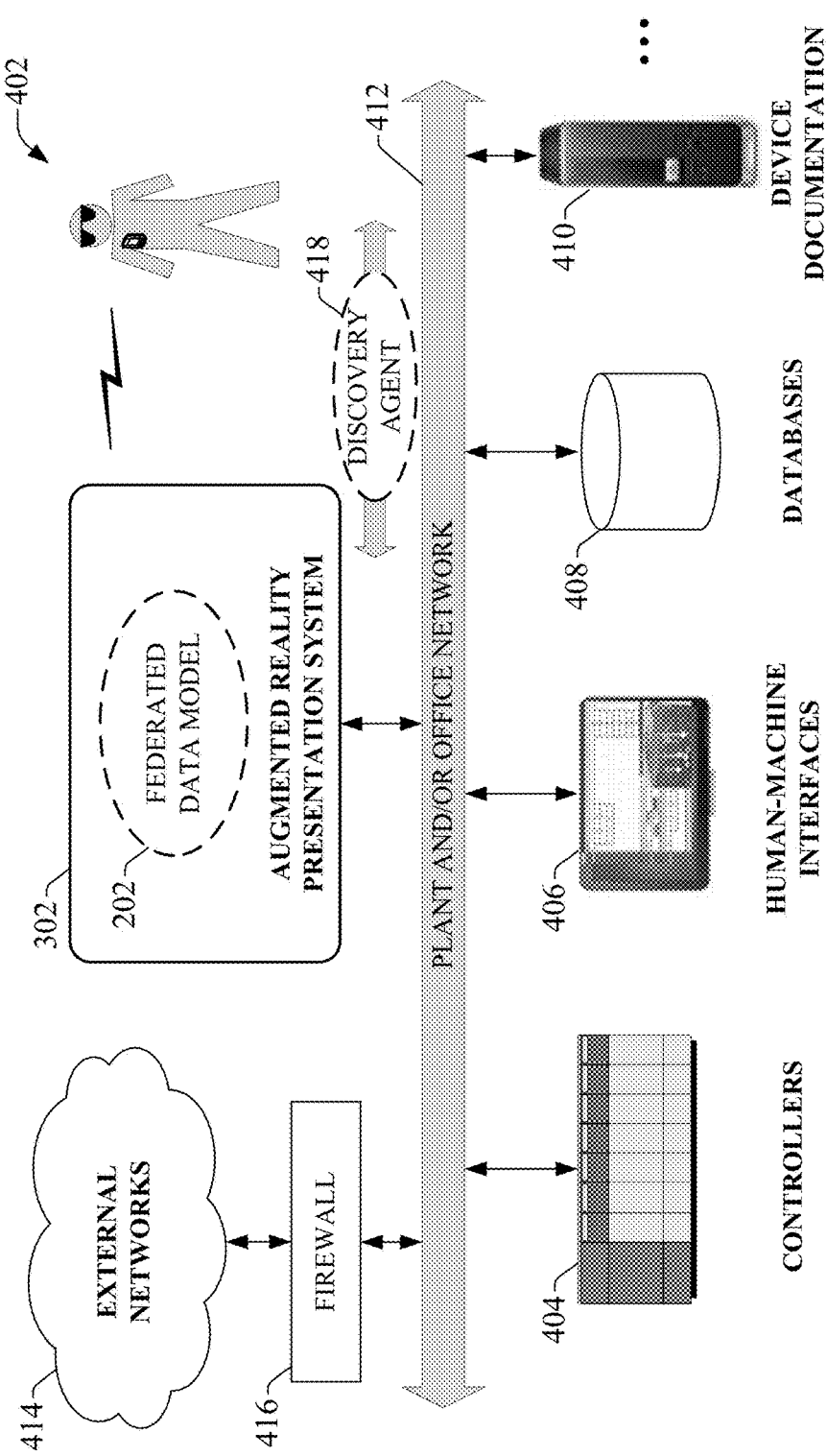
FIG. 4 is a block diagram of a generalized example architecture including an augmented reality presentation system that discovers and indexes multi-platform data throughout an industrial environment, and leverages this data to generate and deliver augmented reality presentations to a user's wearable computer or other client device.

FIG. 4 is a block diagram of a generalized example architecture including an augmented reality presentation system 302 that discovers and indexes multi-platform data throughout an industrial environment, and leverages this data to generate and deliver augmented reality presentations to a user's wearable computer or other client device. It is to be appreciated that the techniques described herein for discovering and indexing industrial data generated within a plant environment are only intended to be exemplary, and that any technique for gathering and indexing data for use in generating augmented reality presentations is within the scope of one or more embodiments of this disclosure.

The example industrial environment depicted in FIG. 4 includes one or more industrial controllers 404, HMIs 406, databases 408 (e.g., data historians, employee databases, inventory databases, etc.), and device documentation repositories 410. The industrial environment may also include other sources of industrial data not depicted in FIG. 4, including but not limited to product inventory tracking systems, work order management systems, etc. Data sources 404-410 reside on a plant and/or office network 412. In some scenarios, data sources 404-410 may be distributed across multiple networks within the plant facility; e.g., a plant network and an office network communicatively connected through a firewall device or other network infrastructure device. Network 412 may also have access to external networks 414 such as the Internet (e.g., via firewall 416).

Augmented reality presentation system 302—which also resides on network 412 in this scenario—discovers and indexes data items that are available in the disparate data sources 404-410 as well as on the external networks 414. The system also indexes relationships between the data items. This can include, for example, recording instances of the same data item residing in multiple data sources (e.g., recording that a data tag corresponding to a particular temperature measurement within one of the industrial controllers 404 corresponds to a data tag within one of the HMIs 406 for displaying the temperature measurement on a display screen), observing that values of certain data items are a function of other data items (e.g., an output coil associated with a first data tag in a ladder logic program is set based on a value of a second data tag used as an output condition for the rung), or other such relationships. In this way, the augmented reality presentation system 302 automatically inventories a customer's industrial environment by discovering the industrial assets in use and their associated available data items. Augmented reality presentation system 302 can also discover relevant data on data sources residing on the external networks 414, including but not limited to device or machine vendor documentation, relevant online knowledgebase articles, vendor product release information, etc. In some embodiments, the system 302 can discover available data items by deploying discovery agents 418 on network 412.

The augmented reality presentation system 302 records the indexed information (that is, the discovered plant-wide data items and their relationships) as a federated data model 202, which can be accessed and searched by a search component based on contextual data collected for a user in order to locate data items relevant to the user's current location and/or context, or by a monitoring component for delivery of automated and/or proactive notifications to the user. Augmented reality presentations can be delivered to the user's wearable computer or other client device. In some embodiments, augmented reality presentation system 302 may be implemented on a web server, allowing the user's wearable computer to access the federated data model via a wireless Internet connection. The presentation system 302 may also be implemented on a networked local server accessible by the user's wearable computer via a wireless network connection. In yet another scenario, the presentation system 302 may be implemented on a cloud platform, where the search system executes as a cloud-based service.

In various embodiments, the federated data model 202 can be monitored automatically by the search and/or monitoring components of the system 302 in order to retrieve and present relevant information to the user's current context as an augmented reality presentation, or to automatically detect issues throughout the plant that may require the attention of plant personnel.

Figure 5:
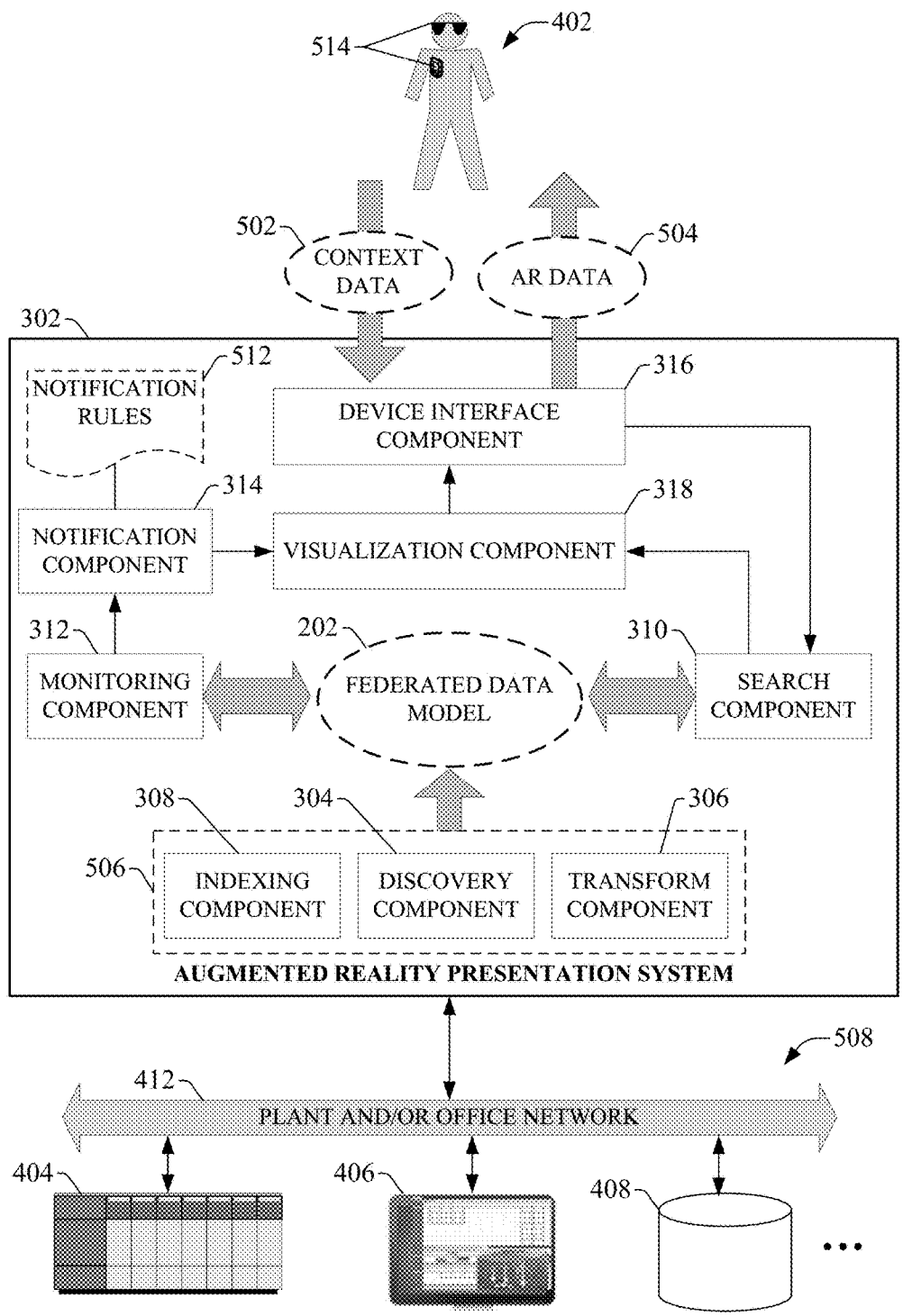
FIG. 5 is a block diagram illustrating components of the augmented reality presentation system.

FIG. 5 is a block diagram illustrating components of the augmented reality presentation system 302 in more detail. In some embodiments, the presentation system may be implemented on a server or other computing device that resides on plant and/or office network 412. In other embodiments, the presentation system 302 may be implemented on a web server, allowing wearable computers or other client devices to remotely access the federated data model 202 via a web connection. In still other embodiments, the presentation system may be implemented as a cloud-based service that executes on a cloud platform.

Indexing system 506—comprising discovery component 304, transform component 306, and indexing component 308—collects information about available data items distributed across a customer's industrial environment, and generates federated data model 202 representing a searchable unified view of the discovered data. The indexing system 506 is configured to discover data items on multiple disparate platforms, including but not limited to industrial controllers 404, HMIs 406, databases 408, electronic documentation libraries, inventory tracking systems, work order management systems, etc. As will be described in more detail herein, some embodiments of indexing system 506 can discover available data items by deploying discovery agents 418 on network 412. These agents traverse network 412 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., controller tags, HMI tags, alarms, notifications, events, data values, tabular data, logs, configuration settings, diagnostic values, alarms, HTML pages, etc.), indexing system 506 can manage and deploy device-specific or platform-specific agents configured to extract and analyze information from specific types of devices or data platforms (e.g., controllers, HMIs, etc.). Some device-specific discovery agents can be configured to locate application project files stored on particular device types (e.g., configuration and/or program files on an industrial controller, screen configuration files on an HMI, etc.), and extract relevant information about the devices based on analysis of data contained in these project files. By leveraging device-specific and platform-specific agents, the indexing system 506 can discover and index data conforming to many different formats and platforms.

In order to unify this disparate heterogeneous data under a common platform for collective searching, the discovery agents can transform the collected data to a format understandable by the indexing system 506 (e.g., extensible markup language or other format), and the indexing system 506 can index this transformed data using a common indexing format compatible with the common search platform. The indexing system 506 then encodes this normalized representation of the discovered data in the federated data model 202. In addition to discovery of devices and their associated data via discovery agents deployed on the plant network, some embodiments of indexing system 506 can also be configured to receive uploaded configuration information from devices that support self-identification functionality, as will be described in more detail herein.

Indexing system 506 can also discover and record relationships—both explicit and inferred—between discovered data items. In some embodiments, the indexing system 506 may record these relationships by tagging discovered data items and building the search index based on these tags, such that related data items share common tags. In some scenarios, these tags may be explicitly defined by a system developer such that the indexing component determines which predefined tags should be applied to newly discovered data items.

As will be described in more detail herein, indexing system 506 can also build portions of federated data model 202 based on data obtained by and received from a user's wearable computer or other client device. Such data may include, for example, multimedia data, RFID data, optically scanned data, or other such data.

Using some or all of these techniques, the indexing system 506 can automatically build a model of the customer's industrial environment, including the disparate and multi-platform devices in use throughout the plant, their associated available data items, and relationships between these data items. This eliminates the need for plant personnel to have full knowledge of the industrial assets in use throughout the plant, since indexing system 506 can automatically inventory a given industrial environment and record discovered devices and data in federated data model 202.

Once created by the indexing system 506, federated data model 202 can be searched by search component 310 based on context data 502 received from a user's wearable computer or other client device, or by a monitoring component 312 that facilitates automated searching and notifications. For each registered user of system 302 (e.g., employees of a particular industrial enterprise), device interface component 316 can monitor and collect context data 502 from those user's wearable computers 514 (or other client devices). This context data 502 can comprise, for example, the user's location within a plant environment, the user's current line of sight (based on a determination of the current orientation of the user's wearable computer), environmental information collected by the user's wearable computer, and/or other such contextual information. This context data 502 is passed to the search component 310, which performs dynamic searches of the federated data model 202 based on the context data 502. In particular, the search component 310 searches selected subsets of the federated data model 202 that are determined to be relevant to the user's current context so that appropriate context-specific augmented reality presentations can be generated. For example, if the user's current location and line of sight suggests that the user is currently viewing a particular automation system (e.g., a palletizer, a stamping press, a conveyor system, an industrial robot, etc.), the search component 310 can search the data index recorded in data model 202 for relevant data sources containing current operational and/or status information for that automation system. The search component 310 can then pass this information to the visualization component 318, which generates an augmented reality presentation for rendering on the user's wearable computer based on the relevant discovered data, and delivers the augmented reality presentation to the wearable device 514 as augmented reality (AR) data 504. Examples of such augmented reality presentations are described in more detail below.

Wearable computer 514 can exchange data with the augmented reality presentation system 302 via device interface component 316, which may comprise a wired or wireless network interface, a near field communication interface, or other such device interface suitable for the particular platform on which the presentation system is implemented. In some embodiments, device interface component 316 may be configured to verify an authorization of the wearable computer 514 to access the presentation system prior to allowing context data 502 to be submitted by the wearable computer. The device interface component 316 may authenticate the wearable computer 514 or its owner using password verification or biometric identification, by cross-referencing an identifier of the wearable computer with a set of known authorized devices, or other such verification techniques.

In addition to generating automated search queries based on the user's current context, some embodiments of the augmented reality presentation system 302 can also support automated dynamic searching independent of the user's current context for the purpose of generating proactive notifications. To this end, some embodiments of augmented reality presentation system 302 may include a monitoring component 312 configured to monitor one or more performance or operational metrics of an industrial system in order to identify issues requiring attention by an operator or maintenance expert. In response to detection of a performance or operational issue, the monitoring component 312 can perform an automated search of federated data model 202 to collect search results relevant to the detected issue. A notification component 314 can then initiate delivery a notification of the detected issue together with a suitable augmented reality presentation to one or more wearable computers or other client devices associated with selected plant personnel determined to be best suited to address the issue.

In an example embodiment, monitoring component 312 may monitor selected data items of industrial system 508 according to defined monitoring rules. The monitoring rules can define, for example, which data tags of the various data platforms distributed across industrial system 508 are to be monitored, as well as criteria indicative of performance issues that, when determined to be true, will trigger an automated search and personnel notification. The monitoring rules can also define which employees are to be notified in response to each type of detected performance issue.

Figure 6:
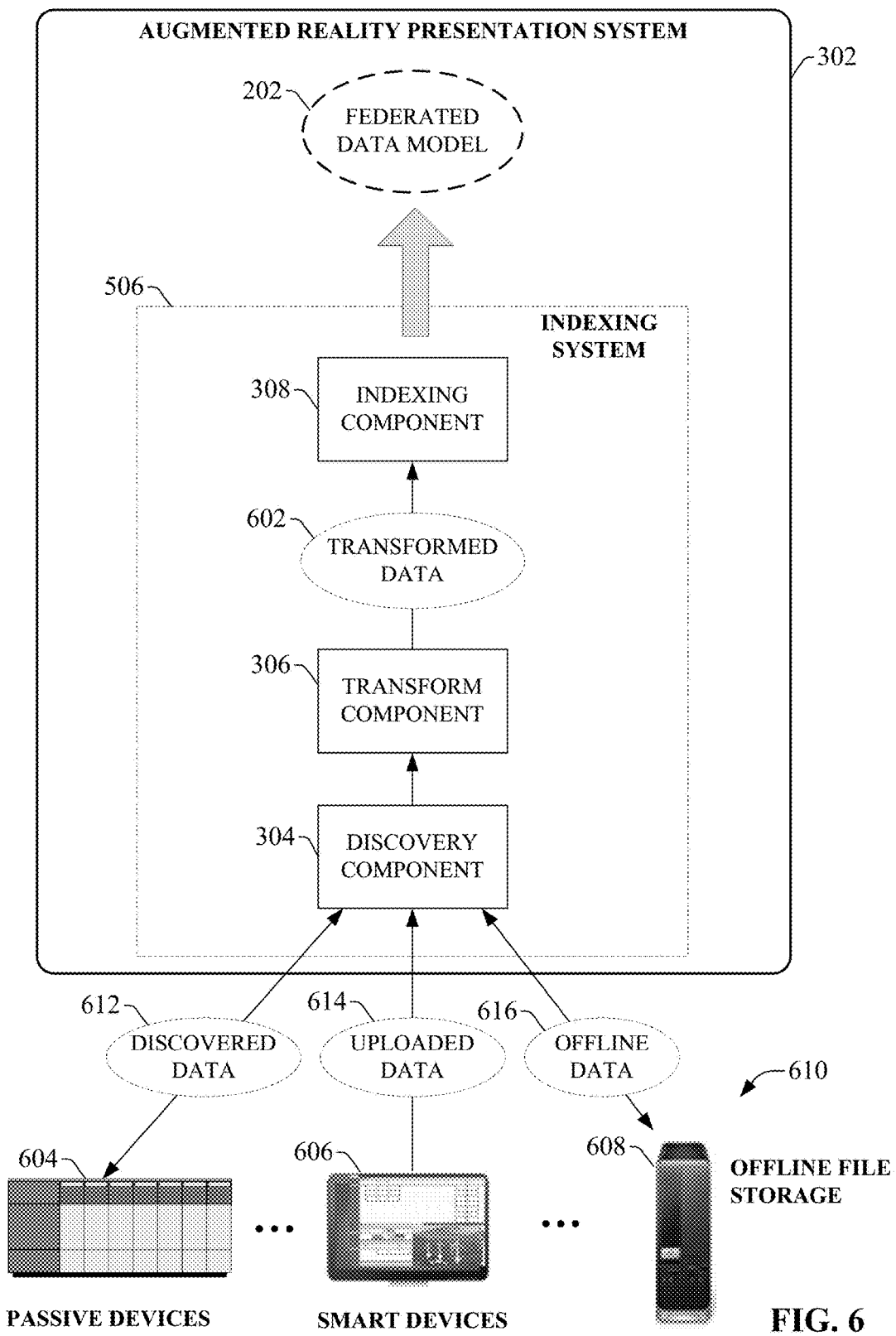
FIG. 6 is a block diagram that illustrates processing performed by an indexing system of an augmented reality presentation system.

FIG. 6 is a block diagram that illustrates processing performed by the indexing system 506 of the augmented reality presentation system 302. A given industrial environment may comprise a diverse, heterogeneous set of data sources 610. In order to unify the data available on these sources under a common namespace for search purposes, the discovery component 304 can be configured to discover data in a number of ways. Some devices within the plant environment may be passive devices 604, which only provide information regarding their available data items in response to a request from the discovery component 304 of the indexing system 506. Such a request may be initiated by the discovery agent 418 (see FIG. 4).

In an example scenario, when the discovery agent 418 discovers a new data source during traversal of the plant network, the agent will examine the data source to identify the data items on that device that are eligible for indexing in the federated data model 202. If the discovered data source is an industrial controller, for example, the available data items may comprise data tags or registers defined by the industrial controller's configuration and programming file. The discovery agent can also identify how and where the data items are used in the industrial controller's program (e.g., ladder logic, sequential function chart, structured text, etc.) so that this information can be indexed as well. For example, upon discovery of the industrial controller on the plant network, the discovery agent 418 may subsequently identify a tag named Tank1 defined in the controller's program file, representing a particular tank of an industrial batch process. In response to discovering this tag, the discovery agent can scan the control program to identify the routines and program locations (e.g., ladder logic rungs) on which Tank1 is referenced. The discovery agent 418 can also identify how each instance of Tank1 is used at each program location (e.g., output coil, normally open contact, function block argument, etc.).

The discovery agent may additionally identify other data items defined in the industrial controller that have a functional relationship with Tank1. For example, upon identifying a reference to Tank1 on an output coil of a rung of the control program running on the industrial controller, the discovery agent 418 can then identify the other data values and statuses defined on that rung that control the state of the Tank1 output coil, and record this relationship between Tank1 and each of the other data values and statuses. In some embodiments, the discovery agent 418 can perform additional scans of the control program to determine additional data values and statuses that affect the states of each of the related data items, since those additional data values/statuses also affect the status of the Tank1 output coil. The discovery agent 418 may iteratively cycle through the control program multiple times in this fashion in order to discover all relevant data items having a functional relationship with Tank1.

In another example, the discovered data source may be an interface terminal executing an HMI application for visualizing a controlled process. In this scenario, the discovery agent may identify the terminal and proceed to scan the tag list defined in the HMI application to identify the data tags referenced by the HMI. These data items can include HMI tags linked to data tags of a networked industrial controller for display of associated controller data values or statuses on one or more of the HMI screens, or for writing values to the controller tags via an input object rendered on an HMI screen (e.g., a data entry field, a virtual push-button, etc.). For each discovered HMI tag, the discovery agent can identify the display screens on which the HMI tag is registered, as well as the external controller tags corresponding to the HMI tag. In some scenarios, the HMI tag may be identified by the same name as the corresponding controller tag (e.g., Tank1), although this may not always be the case.

The discovery agent 418 can package the information collected as described above—including an identity of the data source and its type (e.g., industrial controller, HMI, knowledgebase, device documentation, etc.), data items discovered on the data source, locations of the data items within an application running on the data source (e.g., routine and rung of a ladder logic program, HMI screen, etc.), correlations between the data items, etc.—and send this information back to the discovery component 304 as discovered data 612. Since the discovery agent 418 is capable of performing appropriate analysis on a number of different types of data platforms (e.g., industrial controller, HMI, device documentation, etc.) in order to identify the data platform and its available data, the discovery agent 418 may pre-format the discovered data 612 to conform a format compatible with the indexing system 506 prior to returning the discovered data 612 to the discovery component 304. In this way, the discovery component 304 and its associated discovery agent can automatically normalize heterogeneous data from diverse data formats into a common, homogeneous format that can be collectively processed and indexed by the indexing system.

Figure 7:
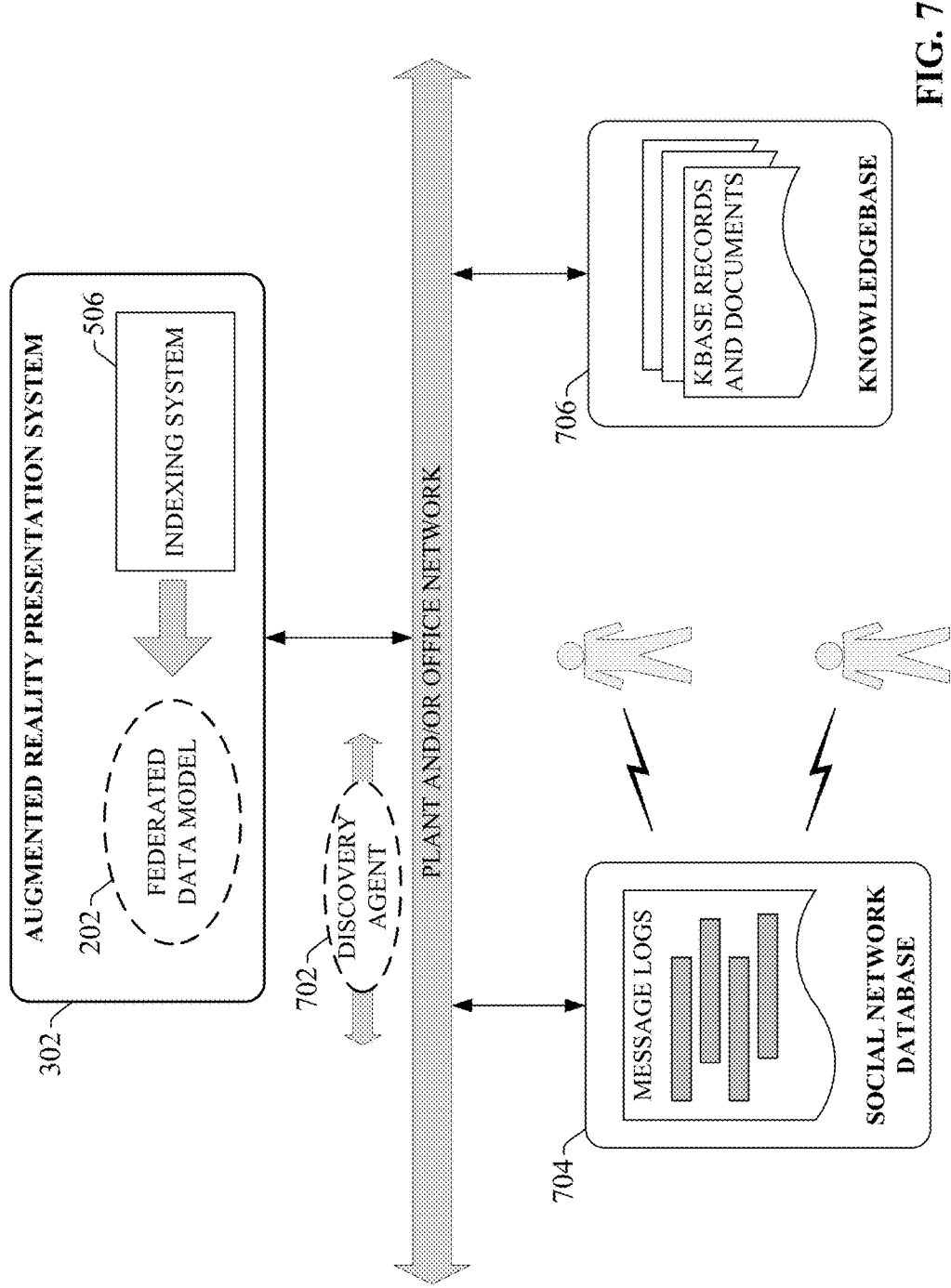
FIG. 7 is a diagram illustrating an architecture in which a discovery agent collects and indexes message log information.

In some embodiments, the discovery agent may also be configured to examine social networks used by plant employees in order to generate tags based on instant messaging discussions relating to a project or troubleshooting issue. FIG. 7 is a diagram illustrating an architecture in which discovery agent 702 collects and indexes message log information. In this example, a social network database 704 stores written communications between plant personnel. The written communications may comprise instant message logs, e-mail threads, text records, or other communication records. During data discovery, the discovery agent 702 can identify the social network database 704 and parse the stored message logs for keywords that may be used to associate the message logs with a particular work area, machine, process, or device. For example, the discovery agent 702 may determine, based on discovery of particular keywords within a message log, that a particular stored conversation was generated in connection with troubleshooting a particular machine or industrial device. Accordingly, the discovery agent 702 can report the presence of the message log to the discovery component with an instruction to tag the message log as being relevant to the machine or device. In this way, when a subsequent search is performed on the federated data model 202 for the machine or device, the message log will be returned as a relevant result. These logs may detail steps taken by maintenance personnel in connection with solving a particular issue with the machine or device, and are therefore flagged by the system as a relevant result when a search is performed on that machine or device.

In some embodiments, the discovery agent 702 may associate relevant supplemental information with a discovered message log based on keyword analysis of the log. For example, the customer may maintain a knowledgebase 706 on the plant or office network containing knowledgebase records and/or device documentation relating to particular devices or maintenance issues. Upon determining that a message log relates to a troubleshooting session for a particular machine or device, the discovery agent 702 (or discovery component 304) may generate an association between the log and a knowledgebase record or device document relating to that machine or device. Thus, when a search is subsequently performed for the machine or device, the presentation system 302 system can present, as part of an augmented reality presentation, a message log outlining steps taken in the past to address a maintenance issue pertaining to the machine/device, with links to relevant knowledgebase articles or device documents to provide supplemental information.

Figure 8:
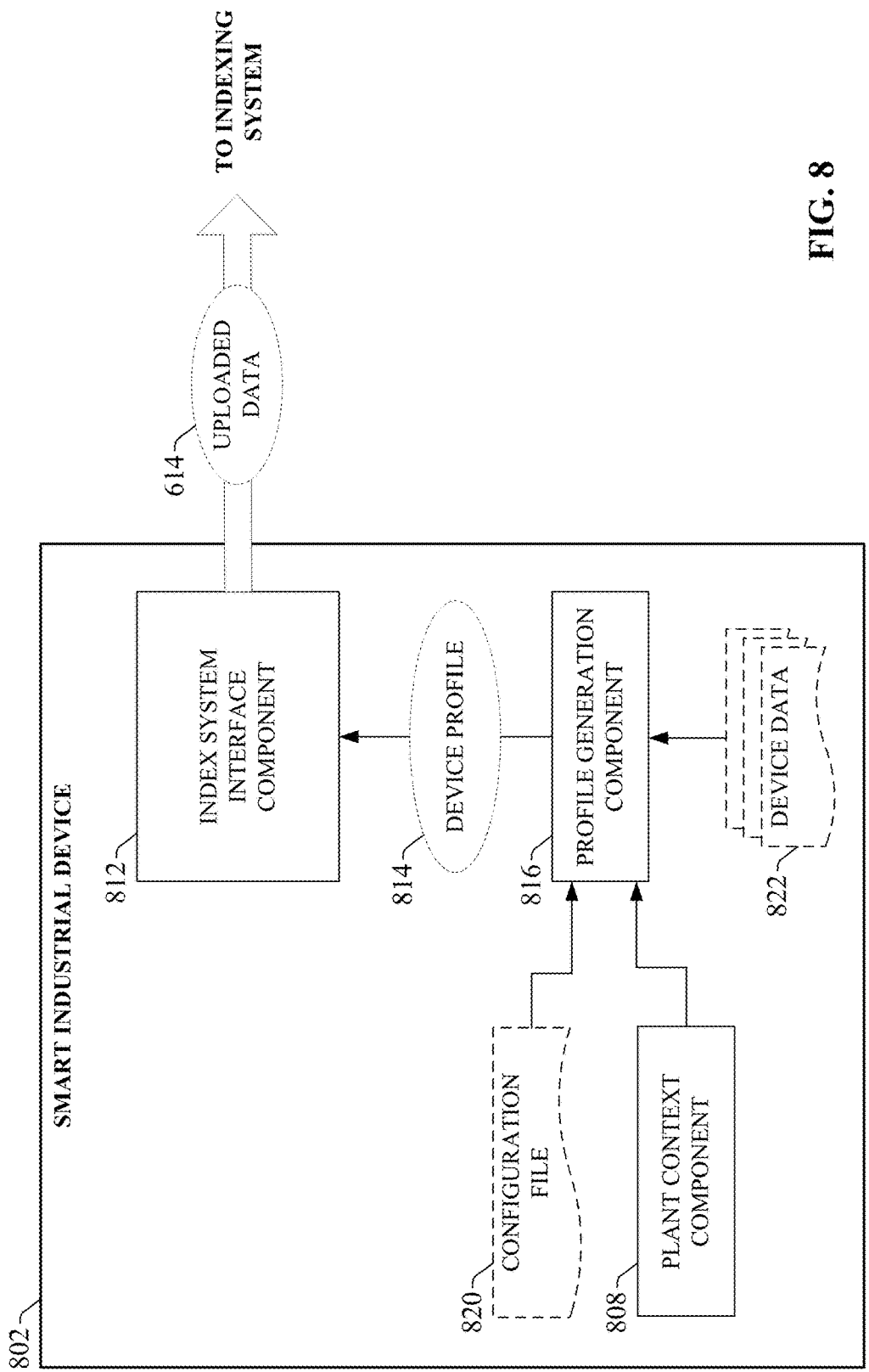
FIG. 8 is a diagram of an example smart device capable of self-reporting to an indexing system.

Returning now to FIG. 6, in addition to passive devices 604, the industrial environment may include one or more smart devices 606 having integrated self-reporting functionality. Such devices can provide uploaded data 614 regarding their identity and available data items to the indexing system 506 directly without the need for analysis by a discovery agent. Turning to FIG. 8, an example smart device capable of self-reporting to the indexing system 616 is illustrated. Smart device 802—which may comprise substantially any type of industrial device or data storage unit (e.g., an industrial controller, an HMI terminal, a motor drive, device documentation storage, etc.)—includes an index system interface component 812 configured to communicatively couple smart device 802 to the indexing system 506 and exchange data therewith; e.g., via a plant network or over a public network such as the Internet (for configurations in which the indexing system resides on a web server or cloud platform).

When smart device 802 is installed as part of an industrial automation system, index system interface component 812 can establish communication with the indexing system 506. In one or more embodiments, the index system interface component 812 can be configured to auto-discover the indexing system 506 on the common network. For example, the smart device 802 may be pre-configured with the identification of the indexing system to which the device is to provide its identity and configuration information (e.g., a name associated with the indexing system, a machine identifier, a cloud or web address, etc.), or may be configured to perform a search of the plant network for compatible industrial indexing and search systems that may be present on the network. Any suitable handshaking protocol may be used to establish communication between the smart device 802 and the indexing system.

Upon discovery of the search system, the smart device 802 can package and send relevant information about the device and its available data to the indexing system, which integrates the reported data items in federated data model 202. In some embodiments, a profile generation component 816 can generate a device profile 814 for smart device 802 to be sent to the indexing system 506 via index system interface component 812. Device profile 814 can convey information about smart device 802, including but not limited to an identity and type of the device, device data 822 available on the device, a context of the device within the industrial environment, any built-in displays or dialog screens (e.g., HTML pages) that provide access to the device's data, etc. In some embodiments, profile generation component 816 may collect configuration information encoded in a configuration file 820 stored on the smart device 802, which may be a control program, a configuration or parameters settings file, an application file (e.g., an HMI application or HTML page), or other such file. The profile generation component 816 can also identify available device data 822 on the device (e.g., real-time or historical data tags, etc.). In some embodiments, the profile generation component 816 can also identify relationships between the data items using techniques similar to those used by the discovery agent, including but not limited to the iterative relationship discovery process described above. The profile generation component 816 can package this information into a device profile 814, which is then sent to the indexing system as uploaded data 614 by index system interface component 812.

Some embodiments of smart device 802 may also include a plant context component 808 configured to collect additional contextual information about the smart device 802 for delivery to indexing system 506. Plant context component 808 can determine a context of smart device 802 within the plant or enterprise environment. For example, one or more embodiments of plant context component 808 can identify other devices and systems within its local environment and make a determination regarding a location of smart device 802 within a hierarchical plant context or device topology. Some embodiments of the federated data model may represent a given industrial enterprise in terms of multiple hierarchical levels and device hierarchies, where each level comprises units of the enterprise organized as instances of types and their properties. Plant context component 808 can gather information that facilitates locating its associated smart device 802 within an organizational or device hierarchy in a number of ways. In one example, plant context component 808 can identify a topology of devices sharing a common network with smart device 802 and interconnections between the devices. For example, if smart device 802 is an industrial controller, plant context component 808 can identify one or more discrete or analog I/O devices connected to the controller (e.g. based on a configuration file 820 that defines the I/O module configurations for the controller). In addition, plant context component 808 can identify other controllers on the network and their role within the overall industrial enterprise (e.g., the production areas, workcells, or processes associated with the respective controllers), or a type of machine to which smart device 802 is connected (e.g., a palletizer, wrapper, conveyor, etc.). In some embodiments, plant context component 808 can also determine an identity of a particular network (e.g., a network name) to which smart device 802 is attached, as well as any security requirements associated with the network or device (e.g., necessary security certificates). This information can be leveraged (either by profile generation component 816 or an external application) to determine the device's location and role within the industrial automation system, since some networks may be dedicated to a particular production area. For networks that use certificate-based security, some embodiments of plant context component 808 can also interact with a Global Discovery Service (GDS) in order to determine a certificate authority and obtain the proper security credentials. In some implementations, the security credentials obtained by the device may be necessary to establish a secure interface between the device and the cloud platform before the device's information can be indexed.

By gathering information about the local device topology, plant context component 808 can facilitate identifying a location of smart device 802 within the enterprise hierarchy. In some embodiments, this determination of the location within the enterprise hierarchy can be made by plant context component 808 itself. Alternatively, profile generation component 816 can include information gathered by plant context component 808 in device profile 814 so that the indexing system 506 can accurately represent smart device 802 within the enterprise or device hierarchy.

Returning to FIG. 6, the indexing system 506 may also collect and index offline data about certain industrial devices rather than gather information about the devices directly from the devices themselves. In this regard, some industrial devices may have information about their configuration, programming, and available data items captured and stored as offline files stored on separate offline file storage devices 608. Accordingly, one or more embodiments of the discovery agent 418 can identify and process these offline files in a similar manner as described above in order to index these devices in the federated data model.

Figure 9:
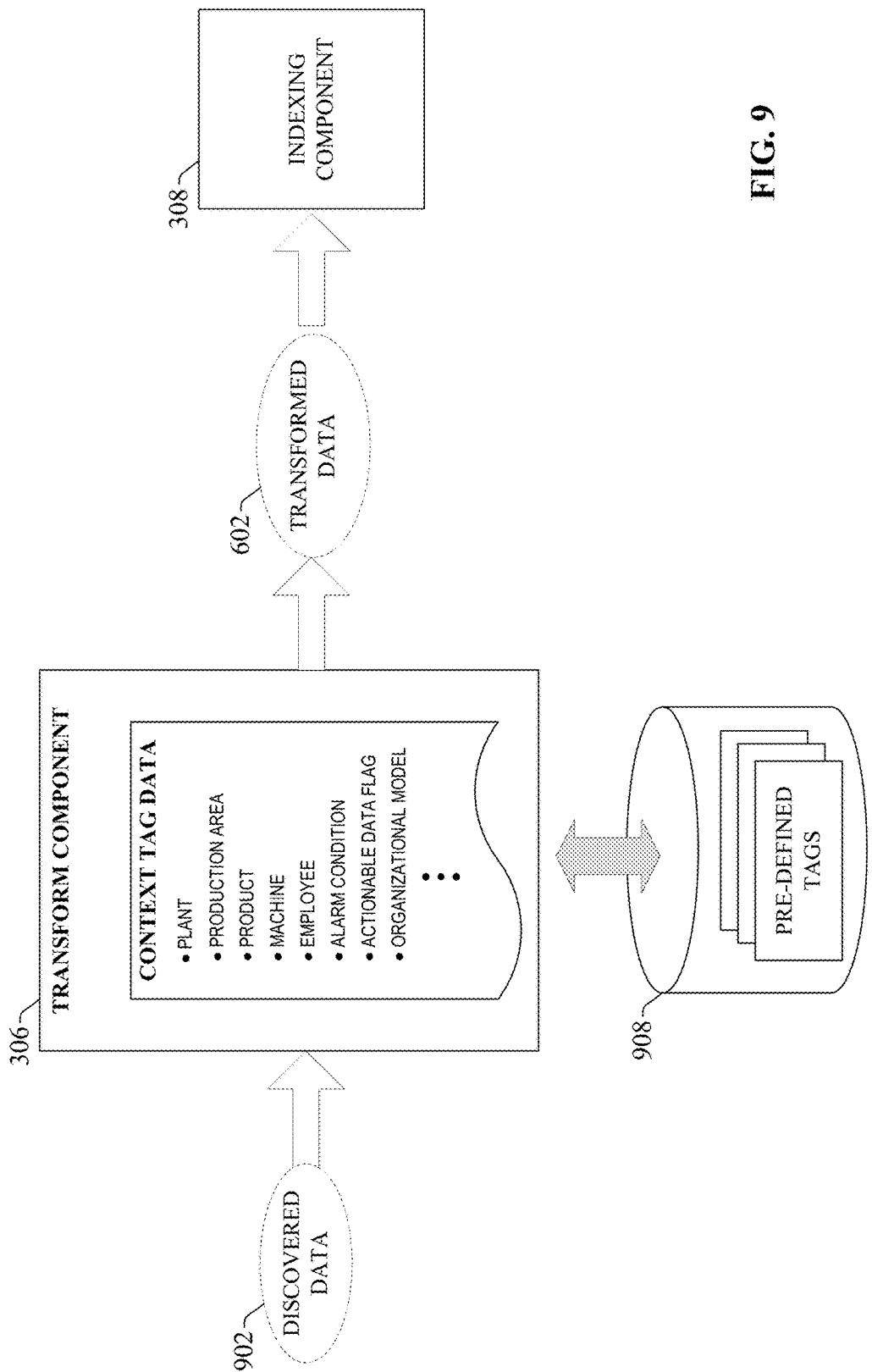
FIG. 9 is a block diagram illustrating transformation of discovered data by a transform component.

Transform component 306 can perform any necessary transformation on the data collected by discovery component 304 prior to indexing. This can include, for example, normalizing any data that was not appropriately formatted by the discovery agent 418, so that all collected data accords to a common format usable by the indexing system 506. In some embodiments, transform component 306 can also add contextual data or tags to the collected data items to achieve highly granular indexing for search purposes, as well as to facilitate subsequent discovery of interdependencies between the diverse and plant-wide data items. FIG. 9 is a block diagram illustrating transformation of discovered data 902 by transform component 306. As noted above, the discovery agent 418 (or discovery component 304) may add some contextual information to the discovered data items prior to sending the data to transform component 306. However, in some cases the transform component 306 may be able to add additional context to this data based on information not available to the discovery agent 418. In other scenarios, the discovery agent 418 may not have been able to contextualize all the discovered data due to limited available information about a given device (e.g., in the case of an older legacy device with limited capabilities).

Contextual data that can be added by transform component 306 for a given data item can include, but is not limited to, an identifier of a plant and/or production area at which the source of the data item resides; a machine or product to which the data item relates; one or more employees to be associated with the data item (e.g., based on the production area, shift during which the data item was collected, etc.); a concurrent alarm condition determined to be relevant to the discovered data item; an actionable data flag indicating that the value of the collected data item requires a response from plant personnel; or a tag indicating the location of the data time within the context of a hierarchical organizational model of the plant (e.g., in terms of an enterprise level, plant level, work area level, machine level, control level, etc.). In some embodiments, alarm and/or actionable tag information can be prioritized by the system such that those informational items are given prioritized processing over other data items (e.g., historical data). In this way alarm and other actionable information can be rendered on the user's client device in a prioritized manner, with other informational items delivered to the user's client device as needed as a particular situation is monitored.

In some embodiments, the transform component 306 can selectively annotate discovered data items with one or more pre-defined tags 908 or metadata defined in association with the indexing system 506. These tags may be used to contextualize the discovered data based on one or more user-defined tag categories based on tagging rules. For example, the user may define a tagging rule indicating that data collected from data sources within a particular workcell or machine of the plant are to be tagged with a pre-defined tag that associates the data items with a person, product, or other classifier for indexing and searching purposes. The tags 908 allow the user to define relationships between sets of data that may not be automatically discoverable by the discovery component 304 and its associated discovery agents. In some embodiments, the indexing system may also be configured to maintain a user-defined system view that allows a user to selectively associate different devices under a combined unit of organization. This user-defined association can subsequently be used by the search system to ensure that all relevant devices are located in response to a search query. For example, when one device (and its associated data) is located within the logical hierarchy of the system defined by the federated data model in response to a search query, other devices having a user-defined association with the located device will also be identified and retrieved as a relevant search result. In some embodiments, these user-defined associations may also be made between selected data items stored on different devices (data-level associations), as well as between the device's themselves (device-level associations).

In some embodiments, the transform component 306 may also auto-generate tags for a given data item based on contextual information, including but not limited to rung comments associated with a controller tag, learned interdependencies between a newly discovered data item and a previously discovered data item (e.g., learn that Pump5 is associated with Tank1, and tag Pump5 as being associated with Tank1, or tag both Tank1 and Pump5 according to the larger system in which they operate), or other discovered contextual information. The indexing component 308 can associate similarly tagged data items in the federated data model 202 regardless of the platform in which they were discovered. For example, the indexing component 308 can associate common or related data items discovered, respectively, in an industrial controller, an HMI, and a data historian.

Returning now to FIG. 6, the transform component 306 provides the transformed data 602 to indexing component 308, which indexes the discovered data and interdependencies therebetween in federated data model 202. The augmented reality presentation system 302 can then submit dynamic search queries to the federated data model 202 for the purposes of generating augmented reality presentations, as described above in connection with FIG. 4.

Figure 10:
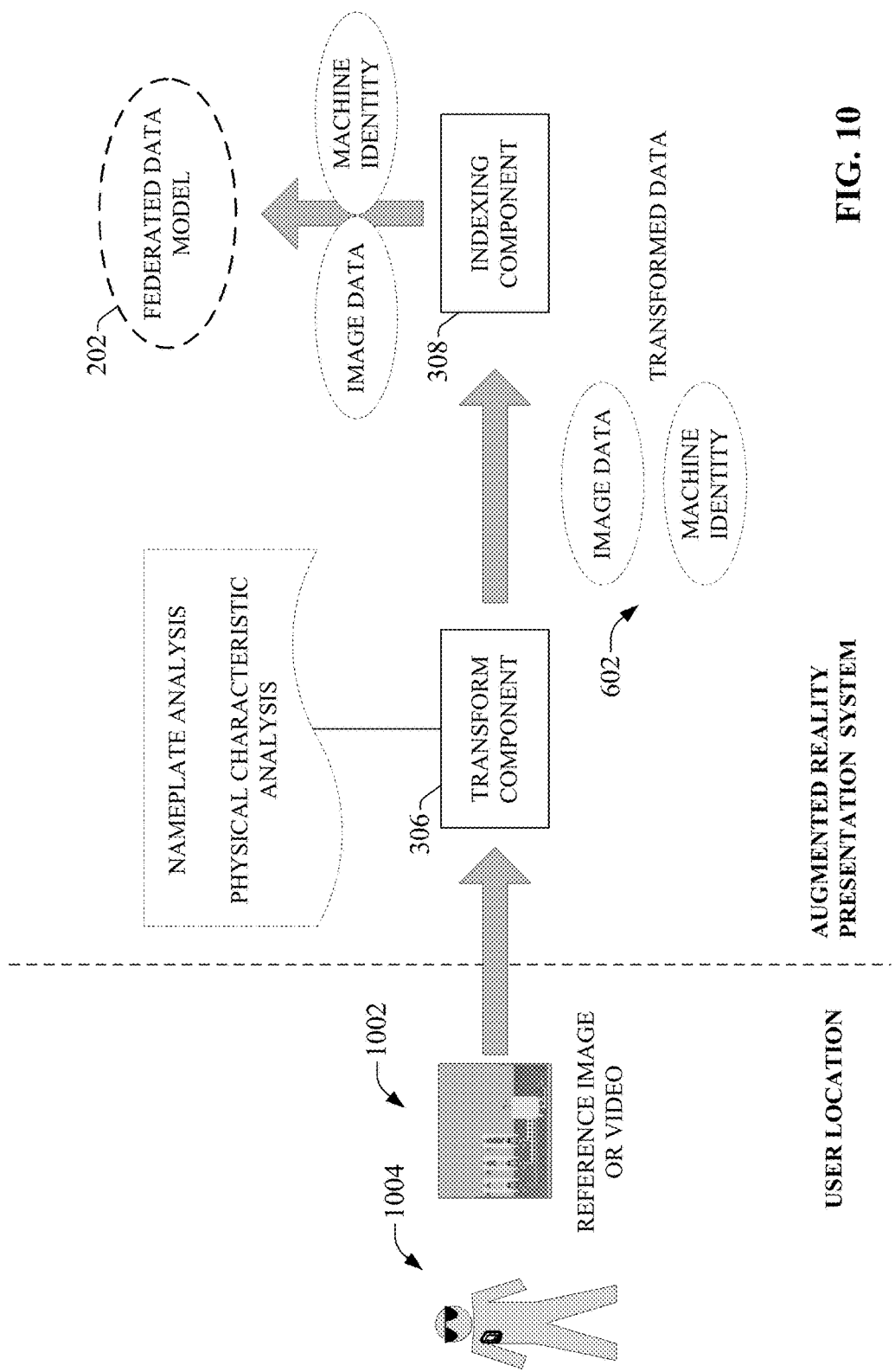
FIG. 10 is a diagram illustrating transformation of a submitted image or video into information that can be indexed in a data model.

In some embodiments, the presentation system 302 can also be configured to index data collected by the user's wearable computer or other client device in data model 202. In such embodiments, the user can perform a scan of a portion of an industrial environment using his or her wearable computer or client device, and submit the scanned information to the system 302 to be translated and indexed into the data model 202. In an example scenario, the scanned information can comprise multimedia data (e.g., image or video information) obtained by the wearable computer. FIG. 10 is a diagram illustrating transformation of a submitted image or video into information that can be indexed in the data model. 202. In this example, a user 1004 performs a visual scan of an automation system comprising a number of machines and/or industrial devices using a wearable computer, resulting in image or video data 1002 representing the automation system. This image or video data 1002 is then submitted to the augmented reality presentation system for indexing (e.g., via a communication channel between the wearable computer and the device interface component 316 of the system 302). The transform component 306 can be configured to analyze the received image or video data 1002 in order to identify device or equipment represented by the data.

For example, the transform component 306 may be configured to recognize nameplate information located on a particular motor or machine recorded in the image or video data 1002; e.g., by first identifying the type of the machine based on its shape or other characteristic features, and then analyzing the location on the machine where the nameplate is expected to be located, where the expected nameplate location is based on the type of machine. Once the nameplate information is discovered in the image or video data, the transform component 306 may perform optical character recognition or other suitable analysis to read and extract the information inscribed on the nameplate. The transform component 306 can then tag the multimedia file with this extracted machine identity information. Some embodiments of the transform component 306 may be configured to employ other methods of identifying machines and industrial devices—e.g., by recognizing other physical characteristics of the machines or devices—as an alternative to nameplate recognition. The resulting transformed data 602 comprising the image or video information and the machine identify information can then be sent to the indexing component 308, which indexes the machine or device identification information (and optionally, the multimedia file) in the data model 202 based on the contextual information applied by the transform component 306.

Some embodiments of the transform component 306 can also be configured to translate barcodes or Quick response (QR) codes affixed to devices or machines. For example, a user may scan or photograph a barcode or QR code attached to a device, machine, or product (e.g., a pin-stamped or laser-etched barcode affixed to a workpiece during the production process) using his or her wearable computer, wherein the barcode contains identification information about the associated component. The wearable computer can then submit identification information extracted from the barcode to the indexing system 506 for indexing within the data model 202. In yet another example, the wearable computer may extract information about an industrial device or its associated process directly from the device via near field communication (NFC) and submit the extracted information to the indexing system 506. This extracted information can include, but is not limited to, a device identifier, device status information read from a status word maintained on the industrial device, alarm data extracted from an alarm register, production statistics stored on one or more data tags, or other such information.

In some embodiments, other scanning technologies can be used to identify machines and/or devices that make up part of an industrial automation system. For example, some industrial devices may be provided with embedded radio-frequency identification (RFID) tags that contain identification information for the devices. Wearable computers or client devices having RFID reader capabilities can scan such devices in order to obtain the recorded device identification information and route this information to the indexing system of the augmented reality presentation system.

Figure 11:
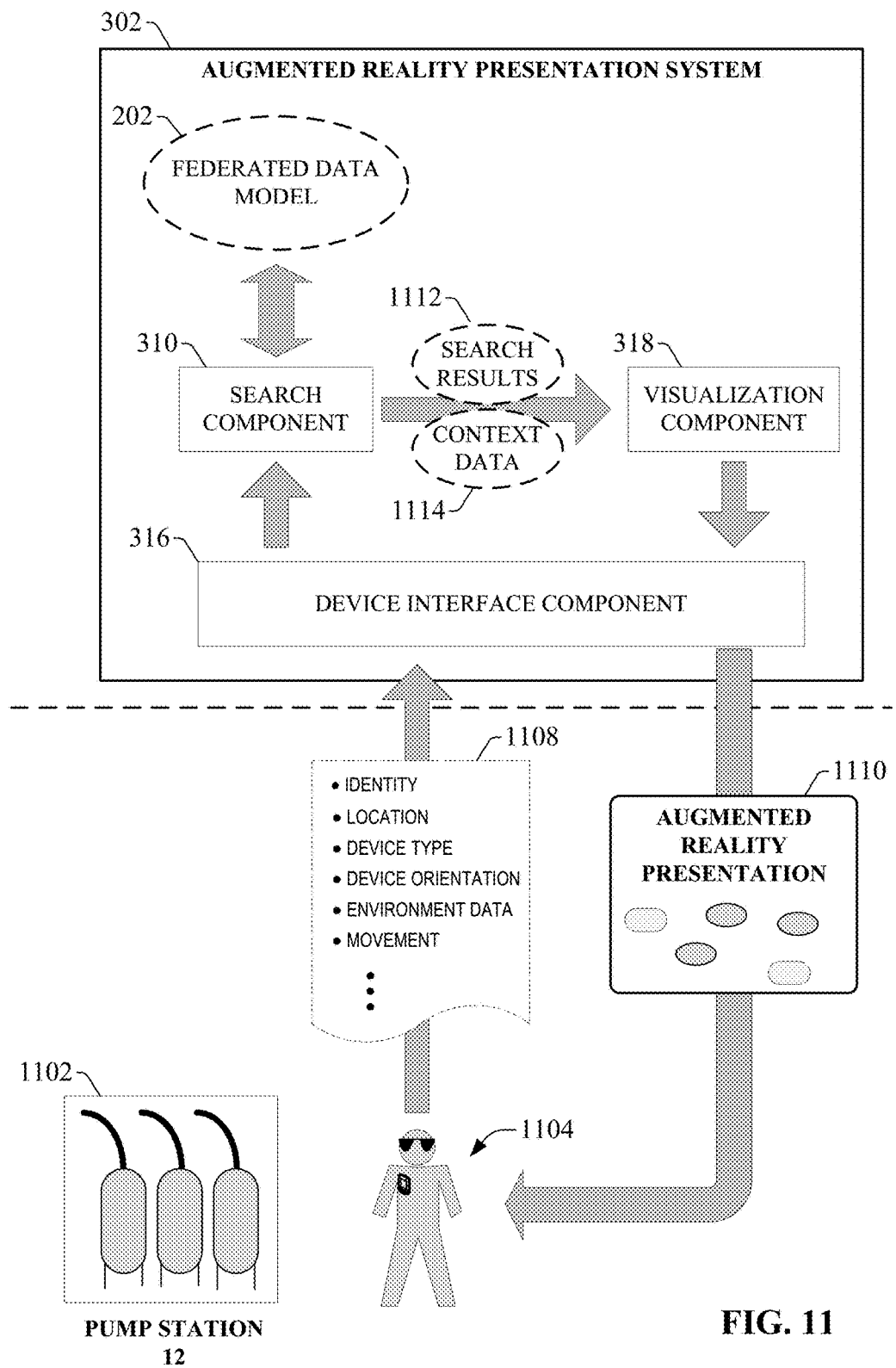
FIG. 11 is a diagram illustrating dynamic generation and delivery of an augmented reality presentation for an industrial system to a user's wearable computer.

With the federated data model 202 established (and dynamically updating to reflect new data sources and machine statuses using techniques described above), augmented reality presentation system 302 can generate and deliver user-specific and context-specific augmented reality presentations to a user's wearable computer or other client device. FIG. 11 is a diagram illustrating dynamic generation and delivery of an augmented reality presentation for an industrial system to a user's wearable computer. In this example, a user 1104 is in vicinity of an automation system 1102 within an industrial environment. The automation system 1102 may comprise one or more machines (e.g., a conveyor system, a die cast furnace, a tooling machine, an industrial robot, a stamping press, a quality check station, etc.) and any associated industrial devices that facilitate monitoring and/or control of the machines (e.g., industrial controllers, digital or analog sensors, motor drives, actuators, proximity switches, vision systems, etc.). The user is wearing a wearable computer, through which the user is viewing the automation system 1102. The wearable computer has established a communicative link to the augmented reality presentation system 302 via the device interface component 316, which has confirmed authorization of the user to access the system. As the user traverses the industrial environment, the device interface component 316 collects contextual data 1108 from the user's wearable computer, which is used by presentation system 302 to perform dynamic searches of federated data model 202 and generate customized augmented reality presentations.

A number of different types of information can be collected for the user by the device interface component 316. For example, the identity of the user associated with the wearable computer can be ascertained by the device interface component 316 based on a unique identifier retrieved from the wearable computer or an explicit user identifier sent by the wearable computer. The system 302 may also determine the user's role within the industrial enterprise (e.g., engineer, maintenance technician, plant manager, machine operator, etc.) based on a cross-referencing of the user's identity with a role database maintained by the system 302. The device interface component 316 can also track the location of the wearable computer within the plant environment using any suitable technique (e.g., global positioning system techniques, triangulation based on WiFi or Bluetooth beacons, etc.). The device type can be identified by the device interface component 316 (e.g., based on the unique device identifier or other information detectable for the device) so that the augmented reality presentations can be customized to the particular device type. The orientation of the wearable computer, from which the system 302 can determine the user's direction of sight, can also be monitored by the system 302. Also, as the user views his or her surroundings through the wearable computer, the wearable computer may collect environment data (e.g., video and/or audio information, ambient measurements, etc.), which is also collected by the device interface component 316.

In addition, the rate of change of the user's location can be monitored as movement data representing the user's rate of movement through the plant environment. This movement information can be used by the system to determine when the user is traversing at a speed that exceeds a defined rate (e.g., a speed indicative of brisk walking speed). In response to such a determination, the system can reduce or eliminate the number of data items being rendered on the user's augmented reality presentation, thereby ensuring that the user's line of sight is not obstructed by data items while the user is moving through the plant.

These types of contextual data 1108 are only intended to be exemplary, and it is to be appreciated that any suitable combination of contextual data items can be collected by the device interface component 316 for generation of augmented reality presentations without departing from the scope of one or more embodiments described herein.

As the device interface component 316 collects contextual data 1108 from the user's wearable computer, the contextual data is passed to the search component 310, which searches federated data model 202 for information relevant to the user's current context as ascertained based on the contextual data 1108. For example, based on a correlation of the user's current location with stored location information for respective automation systems within the plant environment maintained in the data model 202, the system 302 can determine that the user is currently within viewing distance of automation system 1102. The device orientation information, representing a current orientation of the wearable computer, can also indicate to the system 302 that the user is currently viewing automation system 1102. Based on this information, the search component 310 will search federated data model for indexed data relating to automation system 1102, or portions thereof that are within the user's current line of sight. This can include, for example, current status and operational data associated with the automation system 1102 and its associated devices, alarm information currently active for any of the systems or devices associated with automation system 1102, any electronic maintenance notes that were generated for the automation system by other maintenance personnel and indexed in the data model 202, or other relevant data.

The search results 1112 obtained by the search component 310, as well as some or all of the context data 1114 collected from the wearable computer, is passed to the visualization component 318 for generation of an augmented reality presentation 1110. In an example of such an augmented reality presentation, the visualization component 318 may send information and instructions to the user's wearable device that cause graphical and/or textual information to be overlaid on the user's view of the automation system 1102. In an example scenario, the visualization component 318 may cause the wearable computer to display a current operational data value (e.g., a speed, a temperature, a flow rate, etc.) on the user's view of the system 1102, such that the data is displayed at a location within the user's current view that is near the machine or device to which the value is related. The visualization component 318 may also display graphical icons or indicators representing current status information for one or more machines or devices within the user's line of sight. For example, the system 302 may overlay a red indicator on or near a particular variable frequency drive within the user's view to indicate that the drive is currently faulted. The presentation may also render textual alarm information near the faulted drive to indicate the nature of the alarm. In some embodiments, data values that are indicative of a performance or health concern with associated industrial devices or components can be rendered in a manner that causes those values to be displayed more prominently relative to other values (e.g., by displaying those values using a different color, font, or size). In these ways, the augmented reality presentation system 302 provides a proactive, dynamic presentation of the automation systems and devices within the user's viewing range as the user traverses a plant environment. Also, in some embodiments, the system may allow each individual user to prioritize types of information that they prefer to see rendered on their client devices, as well as a preferred presentation priority level for each type of information. Records of such preferences can be saved by the system in association with respective user profiles associated with each individual user.

Figure 12:
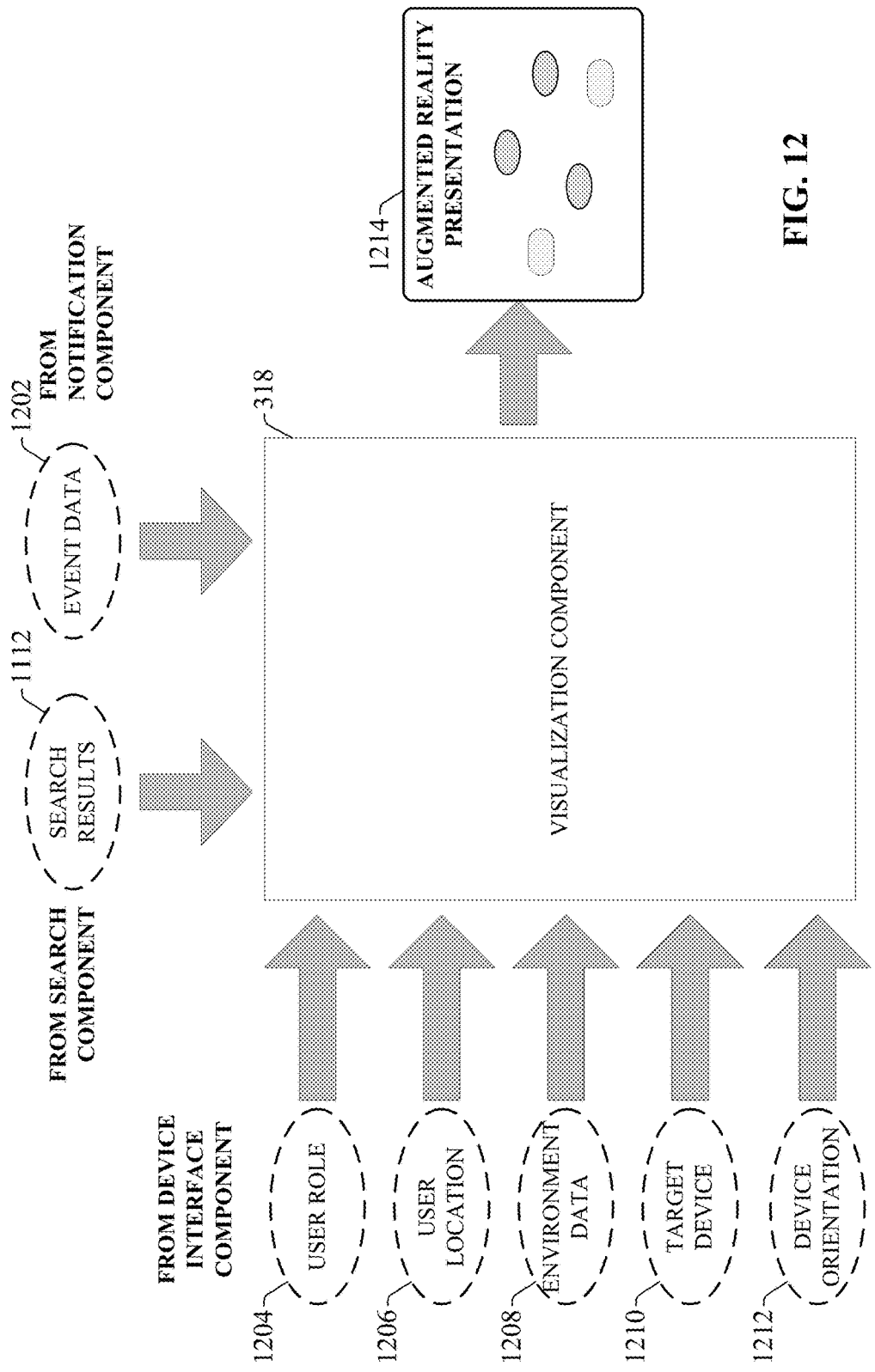
FIG. 12 is a diagram illustrating example inputs that can be leveraged by a visualization component to generate dynamic augmented reality presentations.

FIG. 12 is a diagram illustrating example inputs that can be leveraged by the visualization component 318 to generate dynamic augmented reality presentations. As noted above, contextual data that can be collected for a given user can include the user's role 1204, the user's location 1206, environment data 1208 collected by the user's wearable computer or other client device, a type of target device 1210, a device orientation 1212, and/or other such information. As this data is obtained by the device interface component 316, the visualization component 318 can determine if the user's current context merits generation and delivery of an augmented reality presentation 1214. For example, the visualization component 318 may be configured to generate and deliver an augmented reality presentation 1214 to the user's wearable computer in response to a determination that the user location data 1206 indicates that the user is in viewing range of an automation system for which information is available, and that the device orientation data 1212 indicates that the user is currently facing a direction that places the automation system within the user's field of view. In response to such a determination, the search component 310 can perform a search of the federated data model 202 for data relevant to the automation system within the user's field of view, and provide the search results 1112 to the visualization component 318, which renders some or all of the relevant search results 1112 via an augmented reality presentation 1214 that is customized in accordance with the user's contextual data.

The augmented reality presentation 1214 comprises instructions directed to the user's wearable device that cause the wearable device to render some or all of the search results as overlaid data that is superimposed on the user's field of view, such that each item of information is positioned at a location within the user's field of view that associates the data with the relevant portion of the automation system. For example, the visualization component 318 can cause the wearable computer to render alphanumeric text or a graphical icon representing a current operational statistic or status of a machine within the user's line of sight, at a location within the user's field of view that places the text or icon on or near the relevant machine. The visualization component 318 can update the operational or status data on the user's wearable computer substantially in real-time as long as the user's location and orientation data indicates that the machine is within the user's field of view. If the user's location data 1206 or device orientation data 1212 indicates that the user has moved such that the machine has transitioned to a different location within the user's field of view, the visualization component 318 can cause the text or graphical icon to reposition within the user's field of view in order to maintain the same location relative to the machine. Other types of information that can be rendered in an augmented reality presentation can include, but are not limited to, operating speeds, temperatures, flow rates, production counts, voltages, current operating modes of a machine or automation system (e.g., auto, semi-auto, manual, faulted, etc.), or other such information.

This technique can be used to generate dynamic augmented reality presentations in a number of different scenarios. For example, in addition to delivering augmented reality presentations for automation systems within the user's field of view, the augmented reality presentation system 302 can also generate a presentation for an interior of a control cabinet containing devices that control an automation system, in response to a determination that the user is currently viewing the interior of the cabinet. Such control cabinets may include one or more industrial controllers (e.g., PLCs or other types of controllers), motor drives, contactors, relays, and other such devices. In an example implementation, the presentation system 302 may determine that the user is currently viewing the control panel on which these devices are mounted based on the user's location and orientation data, as well as a status of door switch on the control cabinet indicating that the door of the control cabinet is currently open and the control panel mounted inside the cabinet is exposed to the user's view. In response to this determination, the search component 310 can retrieve relevant information about the devices within the control cabinet, including but not limited to an operating status of a controller (e.g., running, stopped, faulted, etc.), current operating statistics for a motor drive (e.g., motor speed, voltage, frequency, etc.), an open or closed state of a contactor or relay, or other such information. As with the augmented reality presentations generated for the automation system itself, the visualization component 318 causes this information to be superimposed on the user's field of view through the wearable computer, such that each item of information is located on or near the device to which the information pertains. In some embodiments, the system can allow the user to invoke a virtual view of the contents of the control cabinet even while the user is not directly viewing the inside of the physical control cabinet. In such scenarios, the augmented reality presentation may render graphical representations of the devices within the cabinet (e.g., motor starters, disconnects, controller chassis, etc.) together with the relevant statistical data associated with each device.

In addition to generating augmented reality presentations in accordance with the user's current field of view, some embodiments of augmented reality presentation system 302 can also send proactive notifications and corresponding augmented reality presentations to the user's wearable computer in response to a detected issue that may require the user's attention. To this end, monitoring component 312 can monitor selected data items indexed within the federated data model 202 independently of the user's current location or orientation, and trigger a remote notification in response to determining that one or more data items indicate a problem with an automation system or device that merits attention from one or more registered users. For example, based on current status and/or operational information for the various industrial devices indexed in the federated data model, monitoring component 312 can detect when an industrial device or system has generated an alarm or fault, experienced a downtime condition, performed an out-of-sequence operation, or other such condition. For industrial controllers that monitor and control operations of an industrial machine or process, the notification event detected by the monitoring component may relate to the controller's internal operation (e.g., a controller fault) or to the machine or process being controlled. In the latter scenario, the alarm or fault conditions associated with the controlled machine or process may be defined by the user as part of the control program being executed on the industrial controller. For example, process parameter setpoint values, abnormal machine statuses, process alarm conditions, and other such notifiable conditions may be defined by the user within the industrial control program, and such conditions will be detected by the monitoring component 312 and used as the basis for a notification trigger.

Other types of industrial assets, such as telemetry devices, motor drives, etc., may have a different set of associated notifiable conditions that will be monitored by the monitoring component 312. For example, in the case of a motor drive (e.g., a variable frequency drive or other type of drive), the monitoring component 312 may monitor for internal drive abnormal conditions, including but not limited to overcurrent or undercurrent faults, overspeed or underspeed faults, overvoltage or undervoltage faults, etc.

In response to detection of a notifiable event by the monitoring component 312, the notification component 314 can generate event data 1202 indicative of the event, and provide this event data 1202 to the visualization component 318. In an example embodiment, the event data 1202 may identify the device or machine to which the detected event relates (based on information obtained from the data model 202), as well as the nature of the detected event (e.g., a particular alarm or abnormal, a machine downtime event, a deviation of a performance metric from a defined acceptable range or setpoint, etc.). The notification component 314 can also identify one or more suitable recipients to be notified of the event, based on the type of the event and/or the affected machine or device. In this regard, the system 302 can be configured to identify suitable recipients for a notification based on stored notification rules 512 (see FIG. 5). Notification rules 512 can comprise, for example, identities of plant personnel and their respective roles (e.g., operator, maintenance, shift supervisor, billing personnel, plant engineer, inventory manager, etc.), rules regarding which types of users or user roles should receive notifications for different categories of events, restrictions on the types of data that can be presented to each user based on the user's role, location-based restrictions on data presentation, how data should be presented for each type of user, etc. In some embodiments, the notification component 314 may narrow the list of suitable recipients further based on current context information, including but not limited to each potential recipient's current availability or location relative to the source of the detected issue, skills, training on a particular device or piece of equipment to which the notification relates, etc. For example, system 302 may determine each potential recipient's current location by tracking each user's respective wearable computer, and deliver notifications only to those users within a defined radius of the affected machine or device.

In response to receipt of the event data 1202, and when all eligible recipients have been identified, visualization component 318 can generate, for each recipient, an augmented reality presentation that notifies the user of the event, where the presentation is customized to that recipient's wearable computer device and current context. For example, the visualization component 318 may send an instruction to the recipient's wearable computer that causes the wearable computer to render a text-based notification on the user's field of view, the notification briefly describing the problem to be addressed and identifying the affected machine or device. The augmented reality presentation can also render directional icons on the user's field of view that direct the user to the source of the detected issue. For example, based on the user's location within the plant environment relative to the location of the affected machine or device, the visualization component 318 can cause the user's wearable computer to render arrow graphics or other icons on the user's field of view that guide the user in a direction leading to the location of the issue. Once the system 302 determines that the user is in the vicinity of the affected machine or device, the visualization component 318 can render further directional icons on the user's field of view that are designed to direct the user's attention to the specific location of concern (e.g., a graphical indicator superimposed on the user's field of view on or near a faulted device, a source of a detected leak, a blown fuse, an open breaker, a faulty photosensor, etc.). If troubleshooting information for the identified problem is available (e.g., based on indexed maintenance notes, device documentation, support websites, knowledgebase information, etc.), the visualization component 318 may also cause the wearable computer to render troubleshooting workflow graphics that provide the user with guidance in connection with addressing the identified issue.

Figure 13:
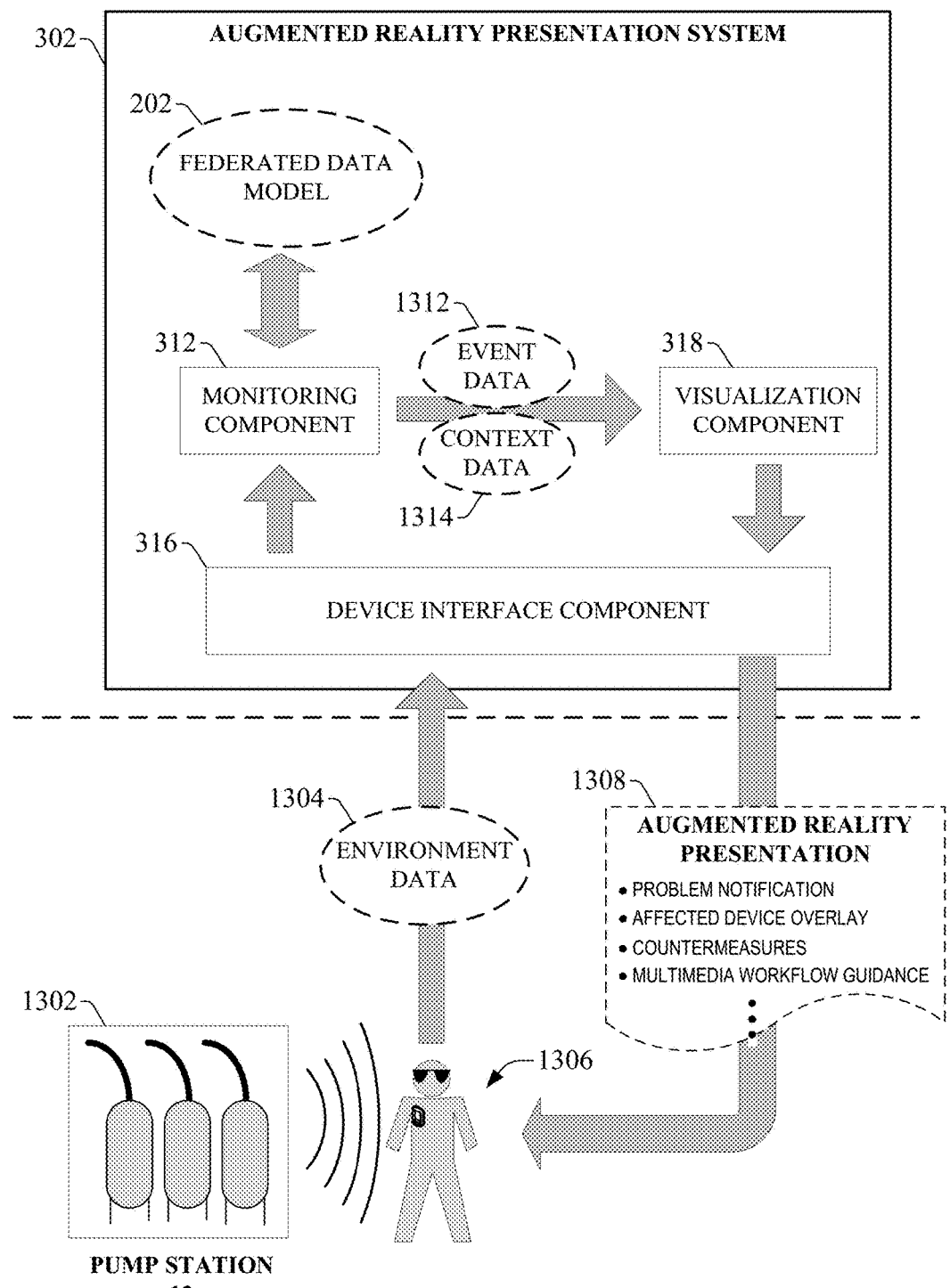
FIG. 13 is a diagram illustrating generation of environment-based augmented reality presentations.

In addition to the features discussed above, one or more embodiments of the augmented reality presentation system 302 can obtain environmental data from the user's wearable computer and generate presentations and/or notification based on an analysis of this environmental data. FIG. 13 is a diagram illustrating generation of environment-based augmented reality presentations. In this example, a wearable computer associated with a user 1306 is tracked and monitored by the augmented reality presentation system 1302, as described in previous examples. In addition to obtaining the user identification, location, and orientation data, device interface component 316 also obtains environment data 1304 collected by the user's wearable computer, where the environment data represents a measurement of an ambient condition within the user's vicinity. Such environment data 1304 can include, but is not limited to, infrared data; heat signature data; vibration data (which may be obtained by the wearable computer via the user's body when the user touches a vibrating component of an industrial machine or system); ambient noise levels; flux data; data indicative of the presence of particular gases, particulates, smoke, or toxins within the user's immediate environment; or other such environmental data.

The collected environment data can be provided to the monitoring component 312, which can determine whether the environment data 1304 is indicative of an issue requiring attention. In some scenarios, the monitoring component 312 can base this determination on an analysis of the environment data 1304 and relevant subsets of data indexed in the federated data model 202, which may define acceptable parameters for various environmental factors relating to the plant environment. If the monitoring component 312 determines that an environmental factor represented by the environment data 1304 is outside an acceptable range or exceeds an acceptable setpoint, the system 302 can generate event data 1312 identifying the abnormal condition, which can be used by the visualization component 318 to generate a suitable augmented reality presentation 1308 notifying the user of the concern.

In an example scenario, the user's current location and orientation may indicate to the system 302 that the user is currently viewing a machine that comprises a number of movable components. Also, based on environment data 1304, the monitoring component 312 may determine that the machine within the user's field of view is overheating. In response to these conditions, the visualization component 318 will leverage event data 1312 identifying this condition as well as context data 1314 identifying the user's context (e.g., role, location, orientation, etc.) to generate an augmented reality presentation 1308 that flags the relevant bearing within the user's field of view (e.g., using a graphical icon or arrow, or using a color-coded glow effect) and notifies the user that the indicated bearing may be overheating. In an example scenario, the augmented reality presentation 1308 may superimpose a color-coded glow around the overheated bearing, where the color of the glow is indicative of the temperature level of the bearing. This type of presentation can be used to flag other heat sensitive devices or components and can serve as a warning to the user that the indicated devices should not be touched until the temperature is decreased to a manageable level.

Using similar techniques, the system 302 may notify the user of the elevated levels of a toxin within the user's immediate environment, an excessive amount of machine vibration or ambient noise that may be indicative of a part failure, or other such events. In some embodiments, the visualization component 318 can also be configured to render countermeasure recommendations for addressing the detected issue. The system can formulate such countermeasures based on a correlation of the identified problem, the type or identity of the affected device or machine, and other relevant information with knowledgebase information indexed in the data model 202. Such knowledgebase information may include, for example, electronic maintenance notes submitted to the system 302 by other maintenance personnel and associated with the relevant machine or device, electronic device documentation or knowledgebase articles, troubleshooting information collected from a website associated with the vendor of the affected machine or device, or other such information.

Figure 14A:
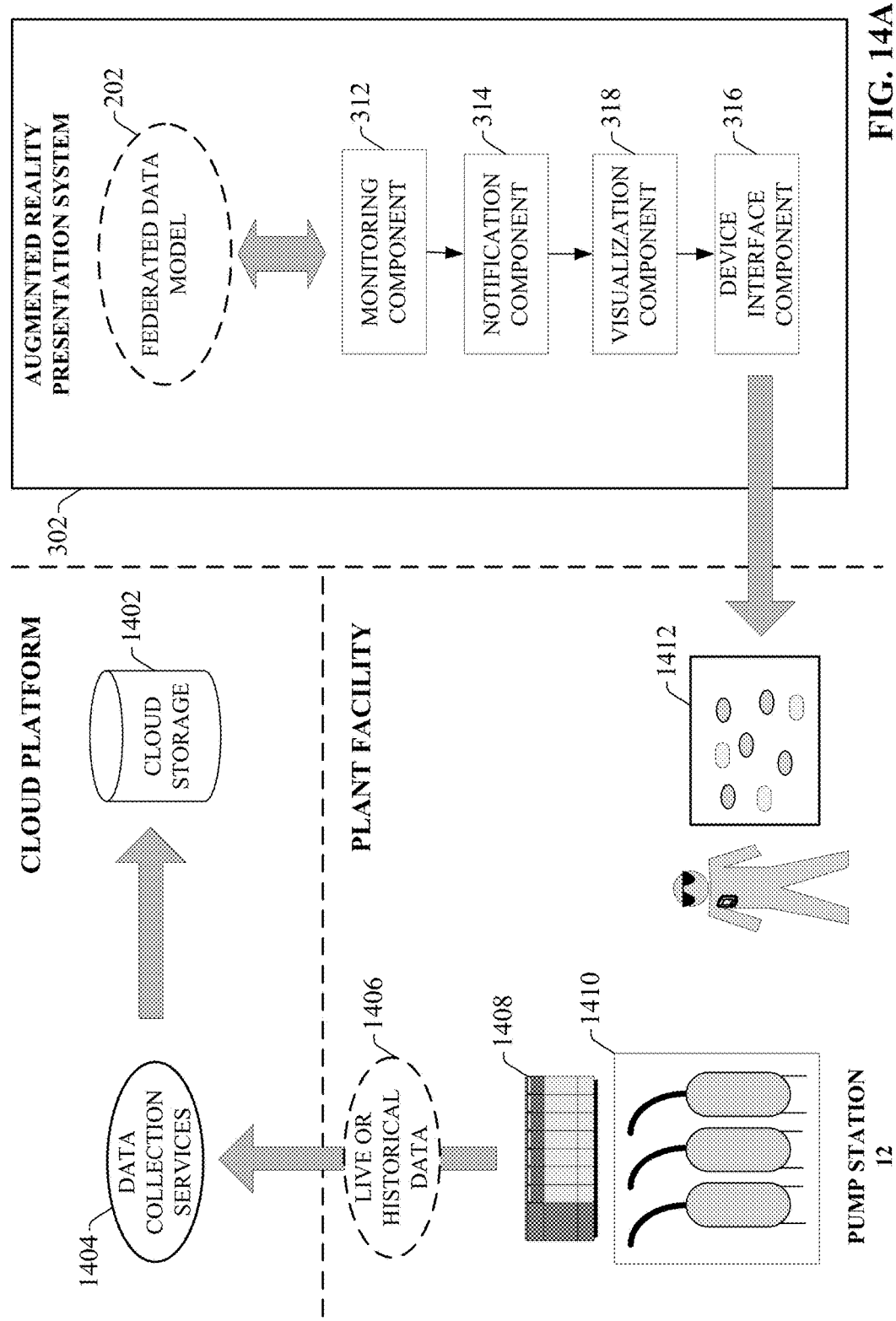
FIGS. 14A-14C are diagrams illustrating dynamic selection of a data source.
Figure 14B:
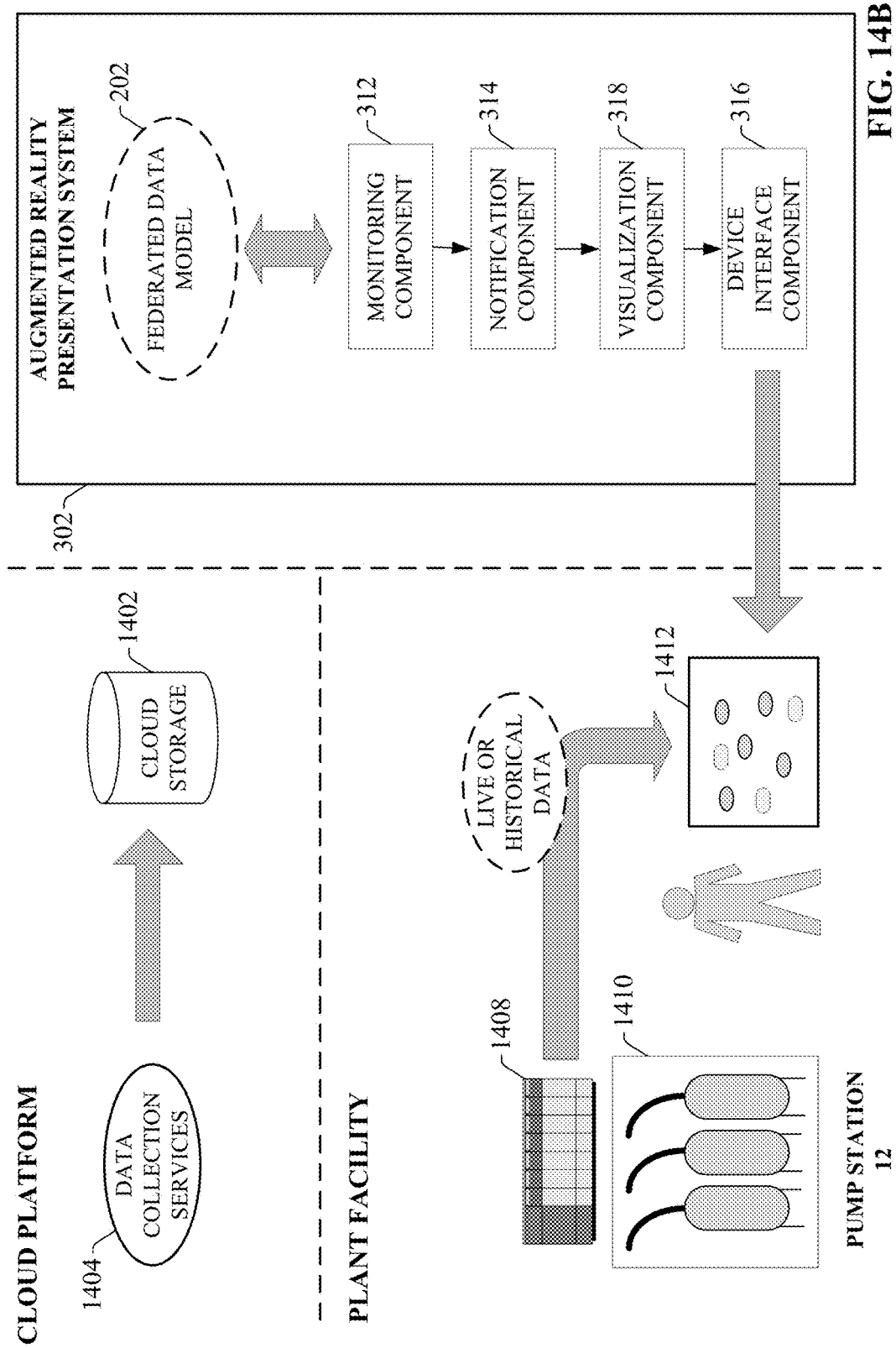
Figure 14C:
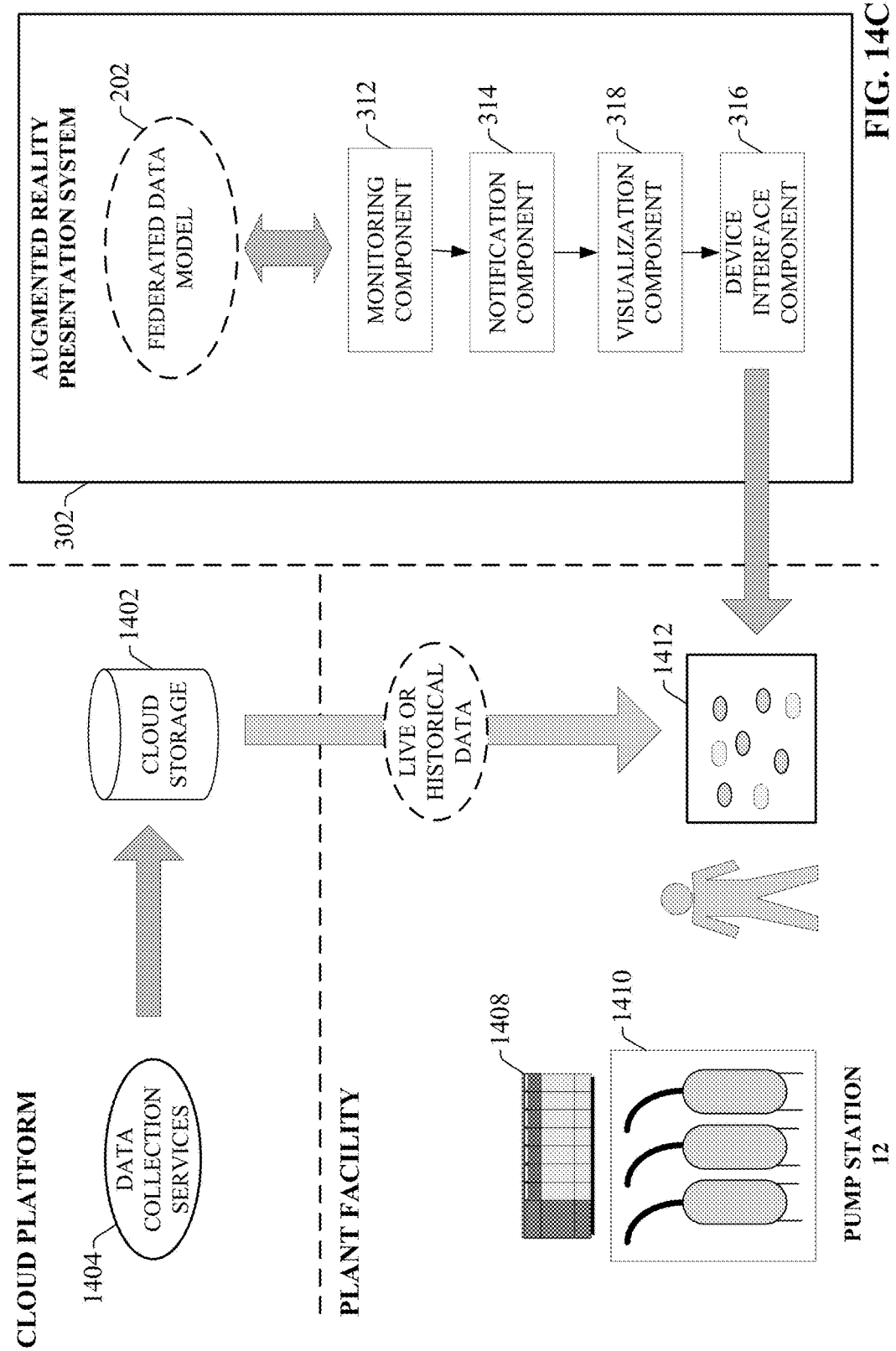

In some embodiments, the live device data used to populate or animate augmented reality presentations may be collected and indexed in the data model 202 by indexing component 308, and subsequently routed to the user's wearable computer or client device as part of the augmented reality presentation. Alternatively, the data model 202 may only index the discovered locations of the various data sources (e.g., industrial controller data tags, data historians, HMI terminals, etc.) throughout the plant environment, as well as communication paths through which these data sources can be accessed. In such embodiments, when the visualization component 318 renders an augmented reality presentation on the user's wearable computer, the presentation may include communication path information that can be used by the wearable computer to identify sources of the data items required to animate the presentation (e.g., controller tag values, etc.) and to retrieve the necessary the real-time data from the identified sources. If the same data item for animating a particular data indicator of the augmented reality presentation is available from multiple sources, the visualization component can configure the presentations to cause the wearable computer to dynamically select the most suitable data source from which to retrieve data for display on the presentation. FIGS. 14A-14C are diagrams illustrating dynamic selection of a data source. As shown in FIG. 14A, an industrial system 1410 (pump station 12) is controlled by industrial controller 1408 in this example. In addition to performing its control functions, industrial controller 1408 exports live or historical data 1406 to data collection services 1404 executing on a cloud platform. The data collection services 1404 may be associated with augmented reality presentation system 302, or may be an independent cloud-based data collection system. The data collection services 1404 may interface with industrial controller 1408 either directly via the plant network, or via a cloud gateway device that resides on the plant network and serves to retrieve selected data items from the controller and send the data to the cloud platform. The exported data may be stored on cloud-based storage 1402 for archival purposes, or may be processed by cloud-based data processing services in connection with other functions (e.g., reporting service, cloud HMI services, analytics services, etc.).

As described in previous examples, monitoring component 312 monitors federated data model 202 (which is kept up-to-date by indexing component 308), and notification component 314, visualization component 318, and device interface component 316 initiate generation and delivery of an augmented reality presentation 1412 to a wearable computer associated with one or more selected users. Presentations can also be generated dynamically based on searches performed by search component 310 (as described above in connection with FIG. 11). Since the system 302 can track the user's location within the plant, the visualization component 318 can dynamically link specific items of the augmented reality presentation 1412 to preferred data sources for the data items (e.g., operational or alarm data) based on the user's location or other contextual conditions. As shown in FIG. 14B, if the system determines that the user is near enough to the industrial controller 1408 to establish a near field communication link between the user's wearable computer and the controller 1408, the visualization component 318 will communicatively link data display items on the augmented reality presentation to their corresponding data table addresses in the industrial controller 1408, such that the presentation is populated with data retrieved from the industrial controller 1408 via the near field connection. If the user is not near the industrial controller 1408, or moves outside the near field range of the controller, the visualization component 318 can link the data items to another source of the data; e.g., the corresponding data items maintained on cloud-based storage 1402, as shown in FIG. 14C. If subsets of the data items required to populate the augmented reality presentation have previously been cached to the wearable computer's local storage, the visualization component 318 may also choose to link those data items to the corresponding stored data items in the client device's cache, providing a third possible source of data. In general, such embodiments of the augmented reality presentation system 302 can dynamically shift the sources of the respective data items on the presentation as the user's location or context changes, to ensure that a most suitable (e.g., nearest, lowest latency, etc.) data source is selected to populate the presentation. In addition to location, other criteria that may be used by the system 302 to determine a most suitable data source for a given data item can include a nearest data source to the user's current location, a source determined to have the lowest latency of the available data sources (e.g., as a function of each data source's processing power or processing load), a data source containing the most recently updated values for the data item, or other such criteria.

Figure 15:
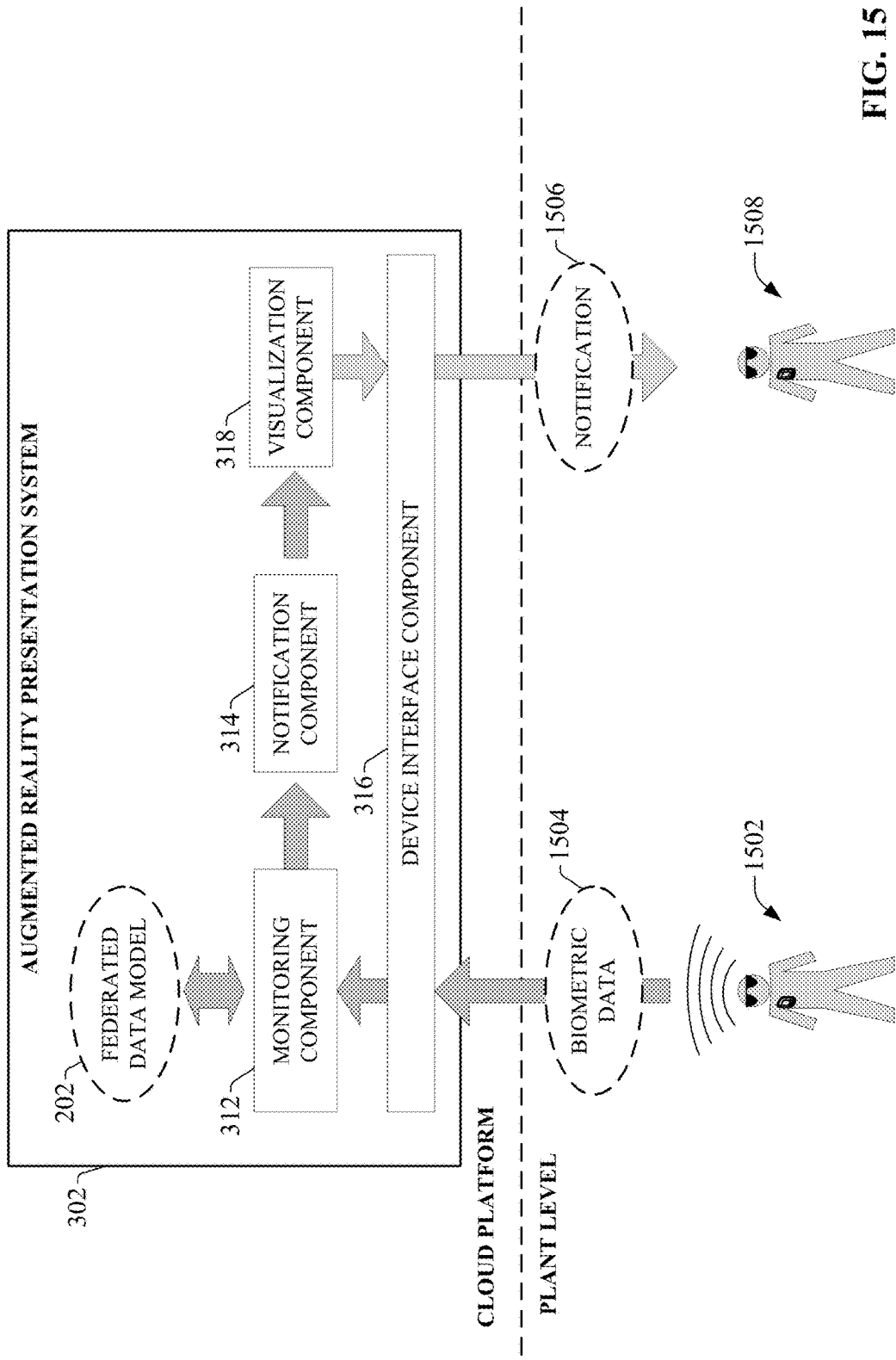
FIG. 15 is a diagram illustrating processing of user biometric data by one or more embodiments of an augmented reality presentation system.

Some embodiments of the augmented reality presentation system 302 can also be configured to process biometric data captured for a user and to generate notifications in response to a determination that the user's biometric data indicates a possible safety hazard or operational efficiency. FIG. 15 is a diagram illustrating processing of user biometric data by one or more embodiments of the augmented reality presentation system 302. In this example, the wearable computer worn by user 1502 can measure and record one or more biometric indices for the user. Such biometric indices may include, for example, the user's heart rate, level of perspiration, blood pressure, breathing rate, or other such indices.

The collected biometric data 1504 can be retrieved from the wearable computer by device interface component 316 (along with other location and contextual data, as described in previous examples) and analyzed by the monitoring component 312 to determine whether the user's current biometric state indicates a potential safety hazard or operational inefficiency relative to an industrial process in which the user has a role. The system can make this determination based on an analysis of user's current biometric state in view of the user's current context relative to the industrial process. For example, if the user's role is that of a machine operator, and the user's present location indicates that the user is in proximity of a machine for which the user is responsible, the system 302 can determine that the user is currently involved in operating the machine. The monitoring component 312 will then monitor and analyze the user's biometric data 1504 under the assumption that the user is currently involved in machine operation, and initiate a notification icon response to a determination that a biometric parameter of the user has fallen outside a range that is defined as acceptable for operation of the machine. For example, if the monitoring component 312 determines that the user's heart rate has been elevated in excess of a defined duration of time, the monitoring component may issue a notification that the user is at risk of becoming too fatigued to continue safe or efficient operation of the machine.

Notifications 1506 relating to the fitness of a plant operator to continue operating a machine or automation system can be sent to one or more other users 1508 (e.g., shift managers or other operators). As in previous examples, the visualization component 18 can send such notifications 1506 can be to the users' wearable computers as augmented reality presentations that identify the user 1502 as well as the identified issue and/or recommended countermeasure. For example, the notification 1506 may comprise a message to user 1508 recommending that user 1502 be relieved from his or her station at the machine for a specified amount of time.

In another example, the monitoring component 312 may monitor the focus of attention of user 1502 over time based on the user's location and the orientation of the user's wearable computer. Analysis of the user's focus of attention may be based on the particular machine or industrial process the user is currently operating, and, more specifically, knowledge of particular areas of the machine or process on which the user should be focusing his or her attention to facilitate safe and efficient operation. In response to determining that a percentage of time spent by the user focusing on these critical areas has dropped below a defined level, the monitoring component 312 can initiate a notification directed to one or more relevant users 1508 (e.g., a shift manager, a foreman, etc.) conveying that user 1502 may not be following best practices for operating the machine or process.

Figure 16:
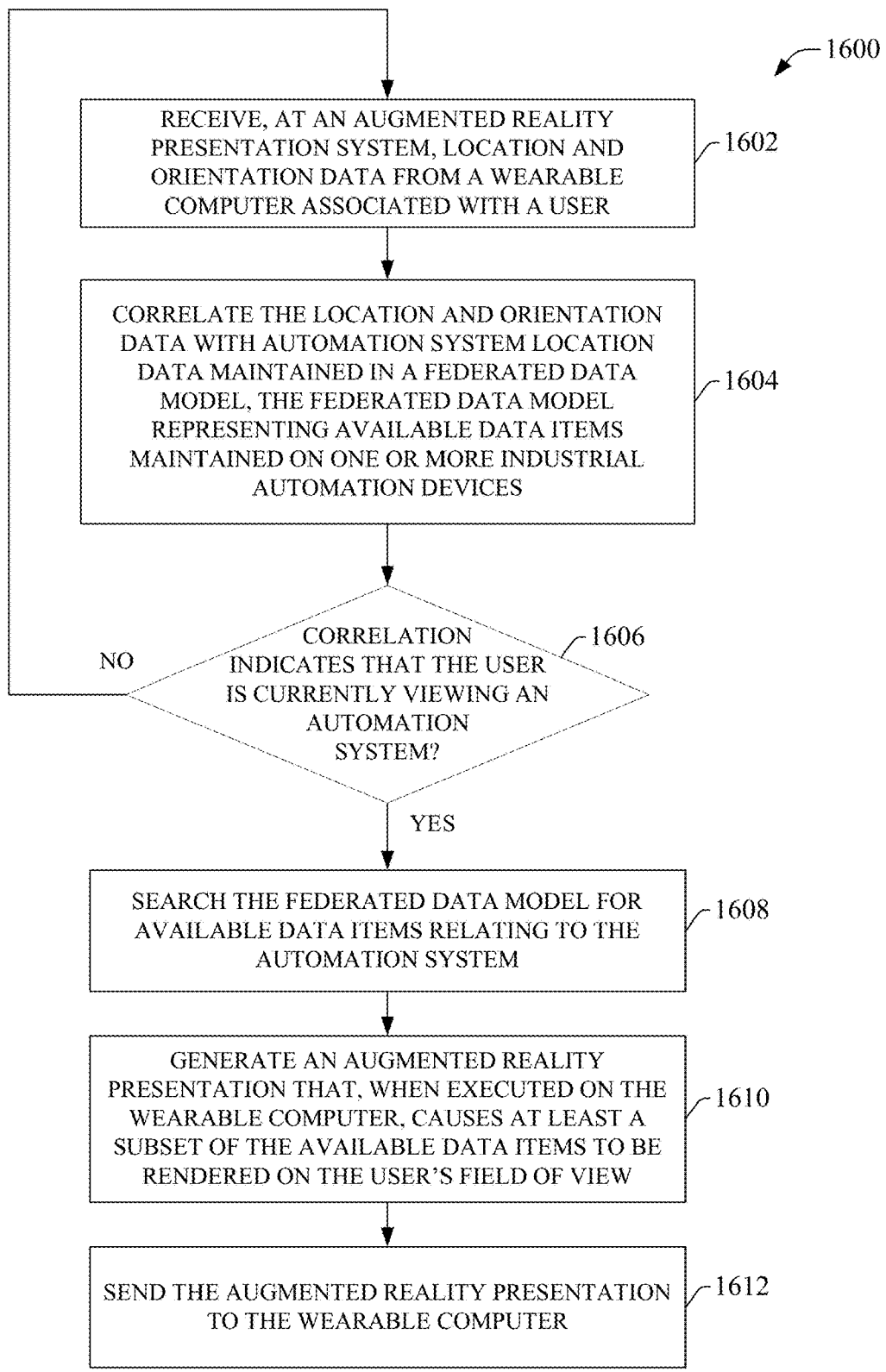
FIG. 16 is a flowchart of an example methodology for generating and delivering customized augmented reality presentations to a wearable computer for presentation of industrial data.
Figure 17:
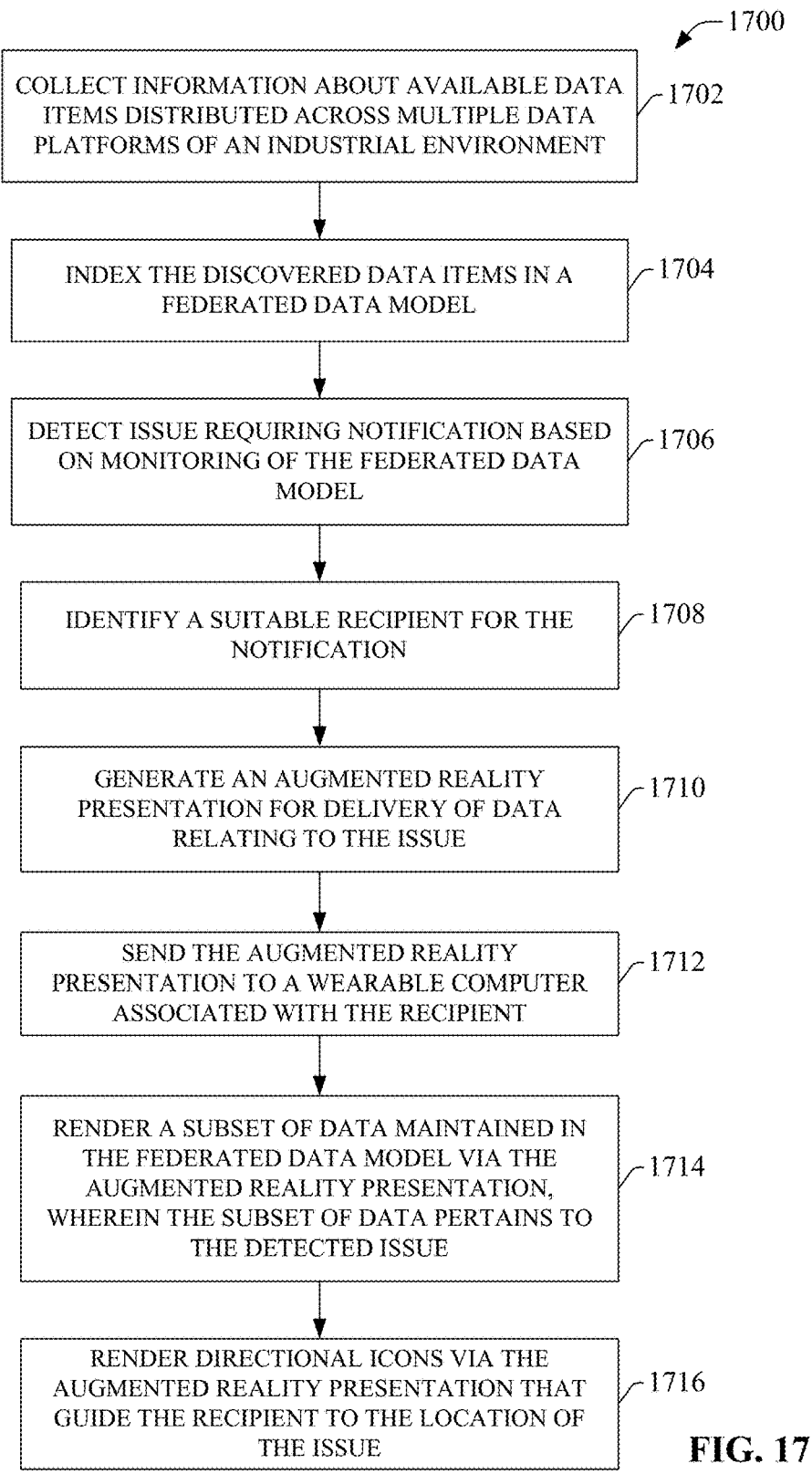
FIG. 17 is a flowchart of an example methodology for generating and delivering customized augmented reality presentations in response to detection of an issue within an industrial plant environment that requires attention by plant personnel.

FIGS. 16-17 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 16 is an example methodology 1600 for generating and delivering customized augmented reality presentations to a wearable computer for presentation of industrial data. Initially, at 1602, location and orientation data is received at an augmented reality presentation system from a wearable computer associated with a user. The augmented reality presentation system can reside on a plant server, a web server, a cloud platform, or any other platform that allows remote data exchange between the system and one or more wearable computers located in a plant facility. The location data can represent a location of the wearable computer (and the user) within the plant facility, and the orientation data can represent an orientation of the wearable computer, which allows the augmented reality presentation system to determine a line of sight of the user.

At 1604, the location and orientation data is correlated with automation system location data maintained in a federated data model. The federated data model can represent available data items maintained on one or more industrial devices within the plant facility, as well as location information for respective automations systems and/or industrial devices within the plant facility. At 1606, a determination is made as to whether the correlation of step 1604 indicates that the user is currently viewing an automation system within the plant facility. If the user is not currently viewing an automation system (NO at step 1606), the methodology returns to step 1602 and the location and orientation data continues to be collected and correlated with the automation system location data. Alternatively, if the user is currently viewing an automation system (YES at step 1606), the methodology moves to step 1608, where the federated data model is searched for available data items relating to the automation system that the user is currently viewing.

At 1610, an augmented reality presentation is generated. The augmented reality presentation comprises instructions that, when executed on the user's wearable computer, cause at least a subset of the available data items discovered at step 1608 to be rendered on the user's field of view within the wearable computer. In particular, the augmented reality presentation causes data values associated with respective components or devices of the automation system to be superimposed on the user's field of view at a location that places the data values on or near their corresponding components or devices. At 1612, the augmented reality presentation is sent to the wearable computer by the augmented reality presentation system.

In some embodiments, methodology 1600 can be iterated multiple times, where the first iteration processes and renders information having a highest criticality (e.g., alarms, actionable tags, safety-related information, etc.), while subsequent passes focus on information of decreasing criticality. This can ensure that critical information is presented more quickly during the first iteration, with less critical information being overlaid in the presentation during subsequent iterations.

FIG. 17 is an example methodology 1700 for generating and delivering customized augmented reality presentations in response to detection of an issue within an industrial plant environment that requires attention by plant personnel. Initially, at 1702, information about available data items distributed across multiple data platforms of an industrial environment is collected. This information can be collected, for example, by an indexing component of an industrial search system implemented on a stand-alone server, a web server, a cloud platform, or other implementation. In some embodiments, the information can be collected using a crawler that navigates a plant network and collects information regarding devices and systems in use (e.g., industrial controllers, HMIs, motor drives, documentation repositories, inventory tracking systems, etc.), and the available data associated with each device or system. The indexing component can also identify correlations between data items across the various devices and data platforms (e.g., identifying that a data tag referenced on a particular rung of a control logic program is also referenced on a display screen of an HMI). At 1704, the data items (and the relationships between the data items) discovered at step 1702 are indexed in a federated data model.

At 1706, an issue requiring notification is detected based on monitoring of the federated data model. For example, a monitoring component can monitor data items maintained in the federated data model relating to performance or operational metrics of an industrial system and determining when the data items satisfy a criterion indicative of a performance issue requiring attention by an operator or maintenance expert. At 1708, in response to detection of the issue, a suitable recipient for the notification is identified. The suitable recipient can be determined, for example, based on defined notification rules that specify one or more plant employees to whom notifications are to be sent in response to detection of different types of performance issues. The rules may specify the employees explicitly (e.g., by defining one or more user identities or user-specific client devices), or may specify a category of employee (e.g., a user role or area of expertise) corresponding to different types of maintenance issues.

At 1710, an augmented reality presentation is generated for delivery of data relating to the issue. The presentation can be generated based on a role of the selected recipient, a type of wearable computer on which the presentation will be rendered, and/or other relevant contextual information. At 1712, the augmented reality presentation is sent to a wearable computer associated with the recipient identified at step 1708.

At 1714, a subset of the data maintained or indexed in the federated data model is rendered via the augmented reality presentation, wherein the subset of data pertains to the detected issue. At 1716, directional icons are also rendered via the augmented reality presentation, where the directional icons guide the recipient to the location of the issue detected at 1706. The directional icons can be configured or oriented on the user's field of view based on the user's current location and orientation relative to the location of the detected issue, such that the user's attention is directed to the location of the relevant automation system, device, or component.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 18:
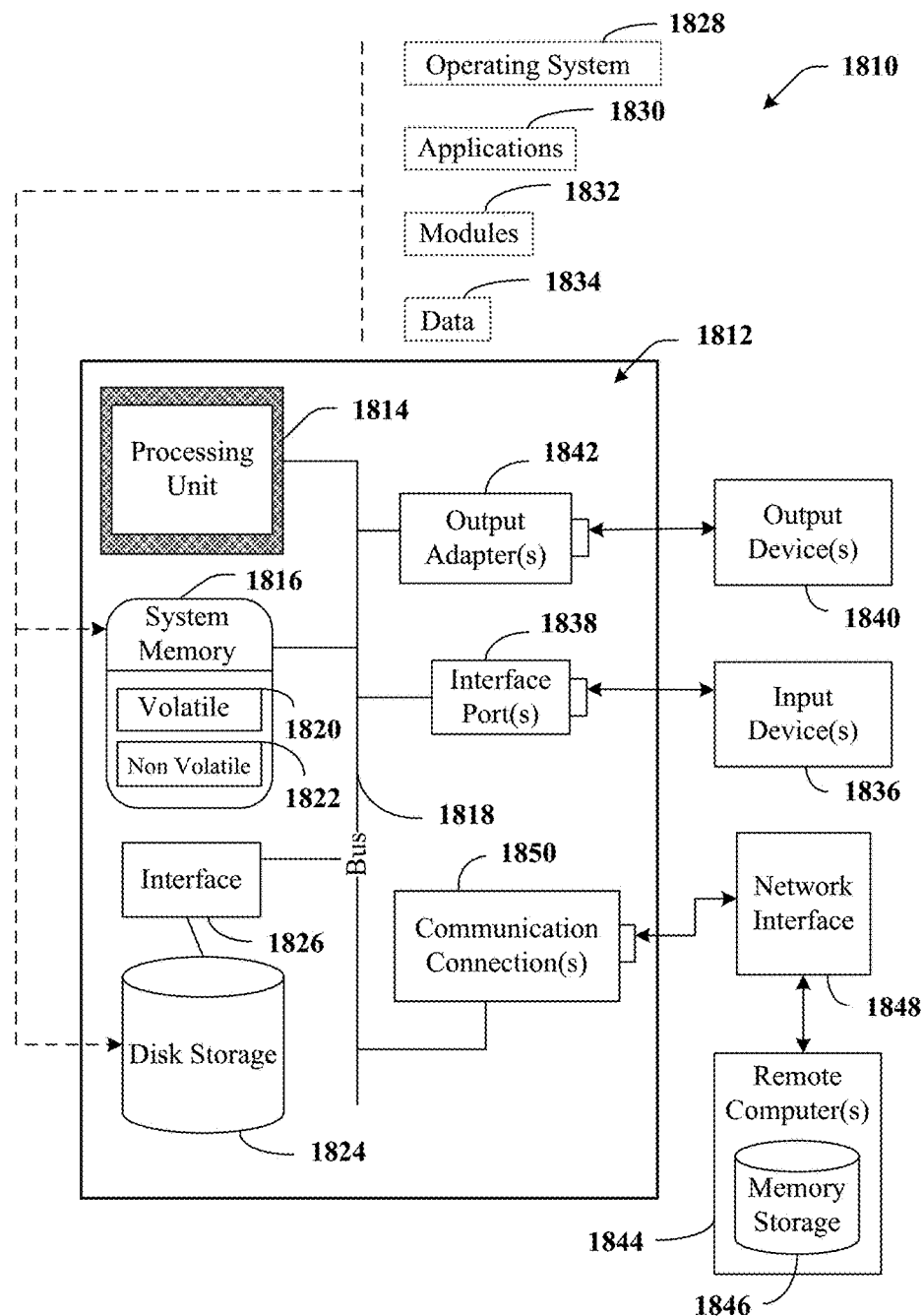
FIG. 18 is an example computing environment.
Figure 19:
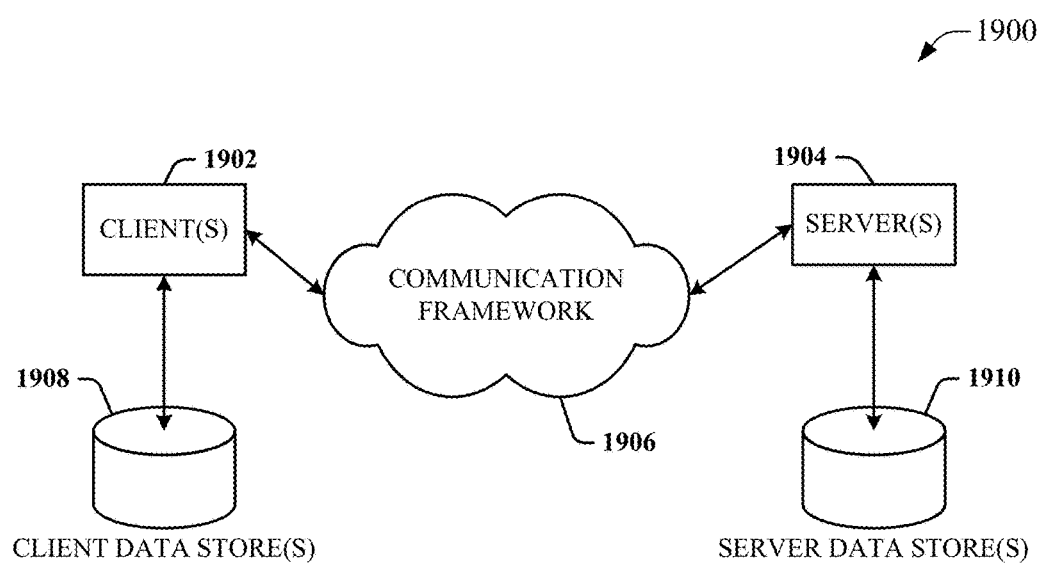
FIG. 19 is an example networking environment.

In order to provide a context for the various aspects of the disclosed subject matter, FIGS. 18 and 19 as well as the following discussion are intended to provide a brief, general description of a suitable environment in which the various aspects of the disclosed subject matter may be implemented.

With reference to FIG. 18, an example environment 1810 for implementing various aspects of the aforementioned subject matter includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Multi-core microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable PROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/nonvolatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer 1812. System applications 1830 take advantage of the management of resources by operating system 1828 through program modules 1832 and program data 1934 stored either in system memory 1816 or on disk storage 1824. It is to be appreciated that one or more embodiments of the subject disclosure can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapters 1842 are provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1848 can also encompass near field communication (NFC) or Bluetooth communication.

Communication connection(s) 1850 refers to the hardware/software employed to connect the network interface 1848 to the system bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample computing environment 1900 with which the disclosed subject matter can interact. The sample computing environment 1900 includes one or more client(s) 1902. The client(s) 1902 can be hardware and/or software (e.g., threads, processes, computing devices). The sample computing environment 1900 also includes one or more server(s) 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The sample computing environment 1900 includes a communication framework 1906 that can be employed to facilitate communications between the client(s) 1902 and the server(s) 1904. The client(s) 1902 are operably connected to one or more client data store(s) 1908 that can be employed to store information local to the client(s) 1902. Similarly, the server(s) 1904 are operably connected to one or more server data store(s) 2010 that can be employed to store information local to the servers 1904.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for generation and delivery of augmented reality presentations, comprising:
    a memory that stores executable components;
    a processor, operatively coupled to the memory, that executes the executable components, the executable components comprising:
        a device interface component configured to receive contextual data from a client device, the contextual data comprising at least location data identifying a location within an industrial environment and orientation data identifying an orientation of the client device;
        a search component configured to, in response to a determination that the contextual data indicates that an industrial automation system is within a field of view of the client device, identify data items that are relevant to the industrial automation system, wherein a first copy of the data items are stored on an industrial device of the industrial automation system and a second copy of the data items are stored in a federated data model on the memory; and
        a visualization component configured to generate an augmented reality presentation that renders the data items on the client device as respective overlays on the field of view,
    wherein
    the visualization component is further configured to:
        while the client device is within a range of near field communication with the industrial device, select, as a source of the data items to be rendered on the augmented reality presentation, the first copy of the data items stored on the industrial device, retrieve the first copy of the data items, and render the first copy of the data items on the client device, and
        while the client device is not within the range of near field communication with the industrial device, select, as the source of the data items to be rendered on the augmented reality presentation, the second copy of the data items stored in the federated data model, retrieve the second copy of the data items from the federated data model, and render the second copy of the data items on the client device, and
    the device interface component is further configured to send the augmented reality presentation to the client device.

2. The system of claim 1, wherein the client device is a wearable computer.

3. The system of claim 1, the executable components further comprising:
    a monitoring component configured to determine that one or more data items stored in the federated data model satisfy a defined criterion indicative of a performance issue relating to an industrial asset; and
    a notification component configured to select a recipient for notification of the performance issue based on one or more notification rules, and to initiate delivery of a notification to a client device associated with the recipient via another augmented reality presentation by the visualization component.

4. The system of claim 3, wherein the other augmented reality presentation comprises at least one of a directional icon that indicates a direction to a source of the performance issue relative to a current location of the client device associated with the recipient or a color-coded overlay positioned near a source of the performance issue.

5. The system of claim 3, wherein
    the device interface is further configured to receive environment data from the client device, and
    the monitoring component is further configured to, in response to a determination that the environment data is indicative of a hazard or a performance problem of the industrial automation system, initiate delivery of another augmented reality presentation to the client device, the other augmented reality presentation rendering information about the hazard or performance issue.

6. The system of claim 5, wherein the environment data comprises at least one of infrared data; heat signature data; vibration data; ambient noise level data; flux data; or data indicative of presence of a gas, particulates, smoke, or a toxin.

7. The system of claim 1, wherein
    the visualization component is configured to position a data item, of the data items, at a location within the augmented reality presentation that causes the data item to be positioned on or near a corresponding industrial device within the field of view of the client device, and
    the location within the augmented reality presentation is determined based at least in part on the location data and the orientation data.

8. The system of claim 1, wherein the visualization component is further configured to select the data items for presentation on the augmented reality presentation based in part on a user role associated with the client device.

9. The system of claim 1, wherein the visualization component is configured to, in response to a determination that a data item, of the data items, has a value that is outside a defined range of values indicative of normal operation of the industrial automation system, render the data item on the augmented reality presentation in a manner that distinguishes the data item from other data items rendered on the augmented reality presentation.

10. A method for generating augmented reality presentations for rendering of industrial data, comprising:
    receiving, by a system comprising at least one processor, contextual data from a client device, wherein the contextual data comprises at least location data identifying a location of the client device within an industrial environment and orientation data identifying an orientation of the client device;
in response to determining that the contextual data signifies that an automation system is within a field of view of the client device:
identifying, by the system, data items that are relevant to the automation system,
selecting, by the system, a source of the data items from among a first copy of the data items stored on an industrial device of the automation system or a second copy of the data items stored on a federated data model maintained on a cloud platform, wherein the selecting comprises:
while the client device is within a range of a near field communication link with the industrial device, selecting, as the source of the data items, the first copy of the data items stored on the industrial device, and
while the client device is not within the range of the near field communication link with the industrial device, selecting, as the source of the data items, the second copy of the data items from the federated data model,
retrieving, by the system, the data items from the source of the data items,
generating, by the system, an augmented reality presentation that renders the data items on the client device as respective overlays on the field of view; and
sending, by the system, the augmented reality presentation to the client device.

11. The method of claim 10, wherein the receiving the contextual data comprises receiving the contextual data from a wearable computer.

12. The method of claim 10, further comprising:
determining, by the system, that one or more data items maintained in the federated data model satisfy a defined criterion indicative of a performance issue relating to an industrial asset; and
in response to the determining:
selecting, by the system, a recipient for notification of the performance issue based on one or more notification rules, and
sending, by the system, a notification to a client device associated with the recipient via another augmented reality presentation.

13. The method of claim 12, wherein the sending the notification comprises rendering one or more directional icons on the other augmented reality presentation, the directional icons indicating a direction to a source of the performance issue relative to a current location of the recipient.

14. The method of claim 10, wherein
the generating the augmented reality presentation comprises orienting a data item, of the data items, at a location on the augmented reality presentation that causes the data item to be positioned on or near a corresponding industrial device within the field of view of the client device, and
the location on the augmented reality presentation is determined based at least in part on the location data and the orientation data.

15. The method of claim 10, wherein the searching comprises selecting at least one of the data items based at least in part on a user role associated with the client device.

16. The method of claim 10, further comprising:
determining, by the system, that a data item, of the data items, associated with an industrial device has a value that is outside a defined tolerance indicative of normal operation of the industrial device; and
in response to the determining, rendering, by the system, the data item on the augmented reality presentation using at least one of a different color, a different size, or a different font relative to other data items rendered on the augmented reality presentation.

17. The method of claim 10, further comprising:
monitoring, by the system, a speed of motion of the client device; and
in response to determining, based on the monitoring, that the speed exceeds a defined speed threshold, removing the data items from the field of view.

18. A non-transitory computer-readable medium having stored thereon instructions that, in response to execution, cause a system comprising a processor to perform operations, the operations comprising:
receiving contextual data from a client device, the contextual data comprising at least location data that identifies a location of the client device within an industrial environment and orientation data identifying an orientation of the client device;
in response to determining that the contextual data indicates that an automation system is within a field of view of the client device, retrieving data items that are determined to be relevant to the automation system, wherein the retrieving comprises:
while the client device is within a range of near field communication with an industrial device that stores a first copy of the set of data items, retrieving, as the data items, the first copy of the data items from the industrial device, and
while the client device is outside the range of the near field communication with the industrial device, retrieving, as the data items, a second copy of the set of data items stored in a federated data model maintained on a cloud platform;
generating an augmented reality presentation that renders the data items on the client device as respective overlays on the field of view; and
sending the augmented reality presentation to the client device.

19. The non-transitory computer-readable medium of claim 18, the operations further comprising:
in response to determining that a data item maintained in the federated data model has a value indicative of a performance issue relating to an industrial asset:
selecting a recipient for notification of the performance issue based on one or more notification rules; and
sending a notification to a client device associated with the recipient via another augmented reality presentation.

20. The non-transitory computer-readable medium of claim 19, wherein the sending the notification comprises rendering one or more directional icons on the other augmented reality presentation, the one or more directional icons indicating a direction to a source of the performance issue relative to a current location of the client device associated with the recipient.

* * * * *